(12) United States Patent
Koide

(10) Patent No.: US 9,391,880 B2
(45) Date of Patent: Jul. 12, 2016

(54) COMMUNICATION SYSTEM, AND METHOD OF COLLECTING PORT INFORMATION

(75) Inventor: Toshio Koide, Tokyo (JP)

(73) Assignee: NEC Corporation, Tokyo (JP)

( * ) Notice: Subject to any disclaimer, the term of this patent is extended or adjusted under 35 U.S.C. 154(b) by 122 days.

(21) Appl. No.: 13/137,485

(22) Filed: Aug. 19, 2011

(65) Prior Publication Data

US 2011/0305167 A1    Dec. 15, 2011

Related U.S. Application Data

(63) Continuation of application No. PCT/JP2010/006875, filed on Nov. 25, 2010.

(30) Foreign Application Priority Data

Dec. 28, 2009    (JP) ................... 2009-298852

(51) Int. Cl.
| | |
|---|---|
| H04L 12/26 | (2006.01) |
| H04L 12/717 | (2013.01) |
| H04L 12/24 | (2006.01) |
| H04L 12/751 | (2013.01) |
| H04L 12/931 | (2013.01) |

(Continued)

(52) U.S. Cl.
CPC ............... *H04L 45/42* (2013.01); *H04L 41/12* (2013.01); *H04L 45/02* (2013.01); *H04L 45/30* (2013.01); *H04L 49/253* (2013.01); *H04L 49/70* (2013.01)

(58) Field of Classification Search
USPC ......... 370/216, 222, 225, 229, 241, 242, 248, 370/252, 254, 255, 351, 389, 392, 428, 431, 370/437, 464, 465
See application file for complete search history.

(56) References Cited

U.S. PATENT DOCUMENTS

| | | | |
|---|---|---|---|
| 5,319,633 A | * | 6/1994 | Geyer et al. ................... 370/254 |
| 7,801,060 B2 | | 9/2010 | Sumiyoshi et al. |
| 8,184,644 B1 | | 5/2012 | Chen et al. |

(Continued)

FOREIGN PATENT DOCUMENTS

| | | |
|---|---|---|
| CN | 1497913 A | 10/2003 |
| EP | 0 588 744 A1 | 3/1994 |

(Continued)

OTHER PUBLICATIONS

Specification (pp. 1-100) and Drawings (Figs. 1(a)-20) of related co-pending U.S. Appl. No. 13/137,486.

(Continued)

*Primary Examiner* — Yemane Mesfin
*Assistant Examiner* — Mon Cheri Davenport
(74) *Attorney, Agent, or Firm* — McGinn IP Law Group, PLLC

(57) ABSTRACT

The control unit specifies an undetected connection destination port and sends a reply request to a connection destination of the undetected connection destination port. The packet transfer unit determines whether the received reply request is to be transferred to any other packet transfer unit. The packet transfer unit, upon determining the reply request to be transferred to any other packet transfer unit, transfers the reply request to any other packet transfer unit. The packet transfer unit, upon determining the reply request not to be transferred to any other packet transfer unit, returns a reply that includes information on ports of the local packet transfer unit, the reply being sent along a path leading to the control unit.

16 Claims, 23 Drawing Sheets

(51) Int. Cl.
*H04L 12/725* (2013.01)
*H04L 12/937* (2013.01)

(56) References Cited

U.S. PATENT DOCUMENTS

| | | | |
|---|---|---|---|
| 2003/0193901 A1 | 10/2003 | Ishibashi | |
| 2004/0141465 A1 | 7/2004 | Jo et al. | |
| 2004/0264484 A1* | 12/2004 | Kui | H04L 12/462 370/402 |
| 2005/0220100 A1 | 10/2005 | Kawabe | |
| 2006/0092862 A1* | 5/2006 | Benedetto | H04L 45/02 370/256 |
| 2007/0076634 A1* | 4/2007 | Sumiyoshi et al. | 370/254 |

FOREIGN PATENT DOCUMENTS

| | | | |
|---|---|---|---|
| JP | 2002-223235 A | 8/2002 | |
| JP | 2004-129054 A | 4/2004 | |
| JP | 2007-104350 A | 4/2007 | |
| WO | WO 2009/042919 A2 | 4/2009 | |

OTHER PUBLICATIONS

"OpenFlow Switch Specification Version 0.9.0", "4.4 Encryption", Jul. 20, 2009 (Searched on Oct. 6, 2011), Internet <http://www.openflowswitch.org/documents/openflow-spec-v0.9.0.pdf>, Jul. 20, 2009.

International Search Report (ISR) (PCT Form PCT/ISA/210) dated Dec. 28, 2010, with partial English translation.

Chinese Office Action dated Mar. 19, 2014 with an English translation.

United States Office Action dated Mar. 26, 2014 in U.S. Appl. No. 13/137,486.

United States Office Action dated Mar. 25, 2015 in U.S. Appl. No. 13/137,486.

European Search Report dated Jun. 25, 2015.

Nick McKeown et al: "OpenFlow: Enabling Innovation in Campus Networks", Mar. 14, 2008, pp. 1-6, XP055002028, Retrieved from the Internet: URL: http://www.openflow.org/documents/openflow-wp-latest.pdf.

United States Office Action dated Nov. 10, 2015 in U.S. Appl. No. 13/137,486.

United States Office Action dated Aug. 7, 2013 in U.S. Appl. No. 13/137,486.

United States Office Action dated Apr. 19, 2016, in U.S. Appl. No. 13/137,486.

* cited by examiner

COMMUNICATION SYSTEM, AND METHOD OF COLLECTING PORT INFORMATION

CROSS REFERENCE TO RELATED APPLICATION(S)

The present application is a Continuation of International Application No. PCT/JP2010/006875 filed on Nov. 25, 2010, which claims priority to Japanese Patent Application No. 2009-298852 filed on Dec. 28, 2009, the entire contents of which are incorporated herein by reference.

TECHNICAL FIELD

The present invention relates to a communication system including a plurality of packet transfer devices and a control unit for controlling the packet transfer devices. The invention also relates to a packet transfer unit, control unit, port information collecting method, and control unit-use program applied to the communication system.

BACKGROUND ART

There is known a communication system including a plurality of switches that each transfer a packet, and a control unit that controls each switch, in the communication system of which, the control unit sets flow entry information in each switch and the switch transfers a received packet in accordance with the flow entry information. The flow entry information provides for the type of processing (e.g., transferring, discarding, updating, or others) that the received packet is to undergo, depending on a header of the packet. Such a communication system requires a control channel used for the control unit to control the switch. For example, if the switch receives a packet not defined in the flow entry information, the switch notifies this to the control unit and then the control unit transmits appropriate flow entry information to the switch according to the particular packet. The control channel is used for purposes such as the notification from the switch to the control unit and the transmission of flow entry information from the control unit to the switch. The protocol used for the control unit to control the switch is called "OpenFlow". The switch can be considered as a packet transfer unit that transfers the packet. The control channel is equivalent to a "secure channel" in the OpenFlow protocol. Also, the control unit is called the "controller" in OpenFlow.

Specifications of OpenFlow are described in Non-Patent Document 1. It is provided for in the specifications of OpenFlow that the control unit and the switch should use SSL (Secure Socket Layer) to communicate in TCP (Transmission Control Protocol) of port number 6633. Accordingly, the communication systems to which the OpenFlow protocol is applied commonly include two independent communications networks. One is a communications network with a plurality of switches for transferring packets in order, and the other is a communications network that operates as the control channel between the control unit and each switch. FIG. 27 is an explanatory diagram that shows an example of a general communication system to which the OpenFlow protocol is applied. Each of the switches 92 shown in FIG. 27 uses a packet transfer communications network 94 to transfer the received packet to other switches in accordance with flow entry information. In addition, a control communications network 93 to serve as the control channel is provided independently of the packet transfer communications network 94, and a control unit 91 controls each switch 92 via the control communications network 93. The control communications network 93 uses a routing protocol such as STP (Spanning Tree Protocol), TCP/IP (Transmission Control Protocol/Internet Protocol), RIP (Routing Information Protocol), or OSPF (Open Shortest Path First).

Furthermore, in the communication system shown by way of example in FIG. 27, when a topology of the switches is changed, each switch exchanges control frames in the communication system and recognizes a new topology. Examples of a control frame for recognizing the topology include, for example, BPDU (Bridge Protocol Data Unit) in STP, and others.

CITATION LIST

Non-Patent Literature

Non-Patent Document 1 "OpenFlow Switch Specification Version 0.9.0", "4.4 Encryption", Jul. 20, 2009 (Searched on Oct. 6, 2011), Internet <http://www.openflowswitch.org/documents/openflow-spec-v0.9.0.pdf>

SUMMARY OF INVENTION

Technical Problem

The OpenFlow-based general communication system in FIG. 27 uses the control communications network 93 and the packet transfer communications network 94. However, in a communication system including a plurality of packet transfer devices and a control unit that controls each packet transfer unit, it is preferable that the communications network used for each packet transfer unit to transfer packets, and the communications network used for the control unit to control each packet transfer unit should be integrated into one kind.

Accordingly, the present invention is intended to provide: a communication system including a plurality of packet transfer devices and a control unit that controls each packet transfer unit, the communication system being configured so that a communications network used for each packet transfer unit to transfer packets, and a communications network used for the control unit to control each packet transfer unit can be integrated into one kind; and a packet transfer unit, control unit, port information collecting method, and control unit-use program applied to the communication system.

Means for Solving the Problems

A communication system according to the present invention includes a plurality of packet transfer devices and a control unit that controls each packet transfer unit, wherein: the control unit includes topology information storing means that stores topology information which includes interconnection information on ports of the control unit or each packet transfer unit, undetected connection destination port specifying means that specifies, from the topology information, (e.g., preferably only) an undetected connection destination port of all ports of the control unit or each packet transfer unit, the undetected connection destination port being a port whose connection destination is undetected, reply request transmitting means that transmits a reply request to a connection destination of the undetected connection destination port via the undetected connection destination port, and reply receiving means that receives, from a packet transfer unit which becomes a connection destination of the undetected connection destination port, a reply that includes information on the ports of the packet transfer unit; and the packet transfer unit includes transfer determining means that determines whether the received reply request is to be transferred to another packet transfer unit based on a content of the reply request, transfer means that transfers the reply request to any other packet transfer unit based on the content of the reply request, when it is determined that the reply request is not transferred to any other packet transfer unit, and reply transmitting means that returns the reply that includes information on the ports of the local packet transfer unit when it is determined that the reply request is not transferred to any other packet transfer unit, the reply being sent along a path leading to the control unit.

A control unit according to the present invention controls a plurality of packet transfer devices, the control unit including: topology information storing means that stores topology information which includes interconnection information on ports of the control unit or each packet transfer unit, undetected connection destination port specifying means that specifies, from the topology information, (e.g., preferably only) an undetected connection destination port of all ports of the control unit or each packet transfer unit, the undetected connection destination port being a port whose connection destination is undetected, reply request transmitting means that transmits a reply request to a connection destination of the undetected connection destination port via the undetected connection destination port, and reply receiving means that receives, from a packet transfer unit which becomes a connection destination of the undetected connection destination port, a reply that includes information on the ports of the packet transfer unit.

A packet transfer unit according to the present invention is controlled by a control unit, the packet transfer unit including: transfer determining means that upon receiving from the control unit a reply request addressed to a connection destination of an undetected connection destination port whose connection destination is undetected, determines whether the reply request is to be transferred to another packet transfer unit based on a content of the reply request; transfer means that transfers the reply request to any other packet transfer unit based on the content of the reply request, when it is determined that the reply request is not transferred to any other packet transfer unit, and reply transmitting means that returns the reply that includes information on the ports of the local packet transfer unit when it is determined that the reply request is not transferred to any other packet transfer unit, the reply being sent along a path leading to the control unit.

A port information collecting method according to the present invention, wherein a control unit that controls a plurality of packet transfer devices executes: specifying, from the topology information, (e.g., preferably only) an undetected connection destination port of all ports of the control unit or each packet transfer unit, the undetected connection destination port being a port whose connection destination is undetected; transmitting a reply request to a connection destination of the undetected connection destination port via the undetected connection destination port; and receiving, from a packet transfer unit which becomes the connection destination of the undetected connection destination port, a reply that includes information on the ports of the packet transfer unit.

A non-transitory, machine-readable storage medium tangibly embodying a control unit-use program according to the present invention is intended to be installed on a computer that controls a plurality of packet transfer devices, the program causing the computer to execute: specifying, from topology information that includes interconnection information on ports of the computer or each of the packet transfer devices, (e.g., preferably only) an undetected connection destination port of all ports of the computer or each packet transfer unit, the undetected connection destination port being a port whose connection destination is undetected; transmitting a reply request to a connection destination of the undetected connection destination port via the undetected connection destination port; and receiving, from a packet transfer unit which becomes the connection destination of the undetected connection destination port, a reply that includes information on the ports of the packet transfer unit.

Advantageous Effects of the Invention

According to the present invention, in a communication system including a plurality of packet transfer devices and a control unit that controls each packet transfer unit, a communications network used for each packet transfer unit to transfer packets, and a communications network used for the control unit to control each packet transfer unit can be integrated into one kind.

DESCRIPTION OF EXEMPLARY EMBODIMENTS

Figure 1:
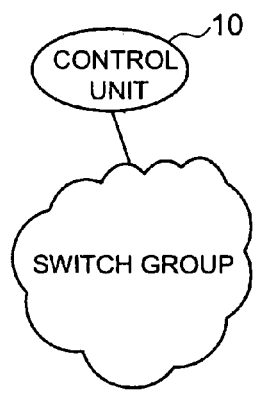
FIGS. 1(a)-1(e) depict exemplarily diagrams that schematically show process steps from a state under which a control unit stores no topology information, until the control unit starts tunneling-based communication.
Figure 1:
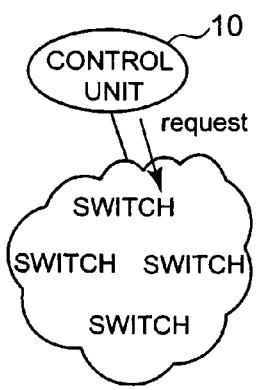
Figure 1:
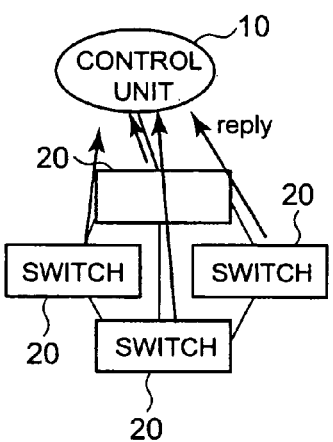
Figure 1:
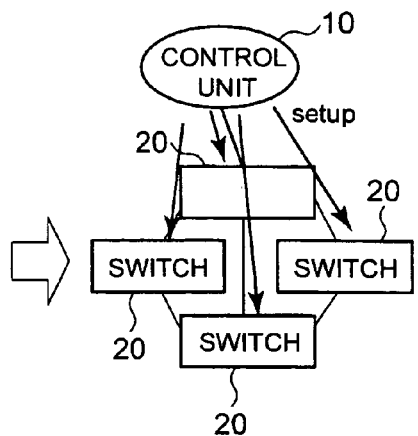
Figure 1:
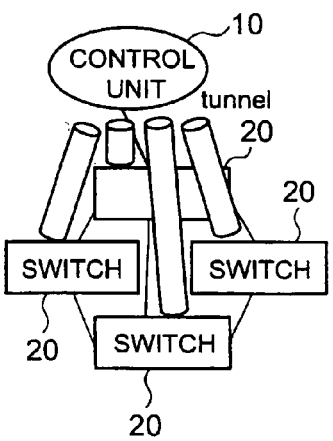

Hereunder, exemplary embodiments of the present invention will be described with reference to the accompanying drawings.

A communication system of the present invention includes a plurality of packet transfer devices that each transfer a packet, and a control unit that controls the plurality of switches (packet transfer devices). The control unit transmits flow entry information to each packet transfer unit, and the packet transfer unit, upon receiving the packet, processes the packet in accordance with the flow entry information. Upon completion of this sequence, a terminal unit connected to one packet transfer unit can transmit the packet to any other terminal unit connected to another packet transfer unit, via a given path, or broadcast the packet to other terminal devices connected to other packet transfer devices, via respective paths.

The packet transfer unit in the present invention is, for example, a switch in OpenFlow, and the control unit in the invention is, for example, a controller in OpenFlow. The following describes an example in which the packet transfer unit and the control unit are the switch and the controller, respectively, in OpenFlow. The invention, however, can also be applied to protocols other than OpenFlow; the invention can be applied to any communication system constructed so that the control unit undertakes centralized management of each packet transfer unit present on a communications network.

The communication system of the present invention does not include a control-dedicated communications network between the control unit (controller) and the switch. The control unit needs only to be connected to at least one switch. The control unit provides control channels between each switch and the control unit itself using the communications network that the switches use to transfer packets. More specifically, the control unit uses links of this communications network to form the control channels between the control unit itself and each switch subsequent to the switch connected to the control unit itself, as viewed from the control unit. After this, the control unit communicates with each switch by tunneling via the control channels and controls the switches. In other words, in the present invention, the control unit can be considered as forming overlay networks of a star structure between each switch and the control unit itself by using the communications network that the switches use to transfer packets.

In the communication system of the present invention, the control unit also stores the topology information that represents interconnection relationships between the ports of the control unit itself and each switch. Individual switches do not need to store the topology information. The control unit, under its initial state, does not store the topology information, inquires of the switch about a connection state of its ports, and creates the topology information. Upon recognizing the topologies of the switches, the control unit determines for each switch a path that functions as the control channel between the switch and the control unit itself, and transmits a packet to notify the switch of the path leading to the control unit. This enables the control unit to recognize the control channel leading to the switch, and the switch to likewise recognize the control channel leading to the control unit. After this, the switch and the control unit communicate with each other via the control channel by tunneling.

FIGS. 1($a$)-($e$) are explanatory diagrams that schematically show process steps from the state under which the control unit does not store the topology information, until the control unit and each switch start tunneling-based communication. FIG. 1($a$) schematically shows an initial state of the communication system of the present invention. Under this state, the control unit 10, although connected to at least one switch of the switch group, does not recognize to which port of which switch the control unit is connected.

In accordance with the topology information, the control unit 10 specifies a port that is in a link-up state, of the ports that the control unit itself or the switch group possesses, wherein the port in the link-up state is a port unknown about to which port of which switch the particular port is connected. This port is hereinafter referred to as the "undetected connection destination port". After conducting the specification, in order that a request packet to inquire the switch for the port in the link-up state will be output from the undetected connection destination port, the control unit 10 transmits the request packet to the switch, as shown in FIG. 1($b$). Since the control unit 10 stores no topology information under the initial state, the control unit 10 specifies, as the undetected connection destination port, a port of the control unit itself whose connection destination switch is unknown, and transmits the request packet from the undetected connection destination port. The port in the link-up state is a port connected to any other switch.

Each switch 20 that has received the request packet returns a packet (hereinafter, it called a "reply packet") from the port of the switch 20 that has been used to receive the request packet, to the control unit 10. This state is shown in FIG. 1($c$). The reply packet includes information indicating the port in the link-up state, information indicating the port of the switch that has been used to receive the request packet, and information identifying the switch 20 itself.

In the present invention, the control unit 10 generates and stores the topology information in accordance with the reply packet. The control unit 10 also specifies the undetected connection destination port from the topology information and transmits the request packet so that this request will be output from the undetected connection destination port. If the undetected connection destination port is a port of the switch 20, the control unit 10 makes each switch transfer the request packet by source routing so that the switch 20 having the undetected connection destination port of interest will output the request packet from the undetected connection destination port. The switch 20 that has received the request packet will also transmit the reply packet from the port of the switch that has been used to receive the request packet, and the control unit 10 will incorporate a content of the reply packet into the topology information.

In this way, the control unit 10 repeats specifying the undetected connection destination port, transmitting the request packet, receiving the reply packet, and generating topology information. When the control unit 10 becomes unable to specify the undetected connection destination port from the topology information, the control unit determines that the topology information has been completed.

After this, the control unit 10 determines the path that operates as the control channel, for each switch in accordance with the topology information. Thus, the control unit 10 recognizes the control channels for each switch. The control unit 10 then transmits a setup packet to notify each switch of the path, or the control channel (see FIG. 1(*d*)). Each switch 20 that has received the setup packet stores the path, or the control channel extending from the switch 20 itself to the control unit 10, in accordance with the setup packet. This makes the switches 20 able to recognize the respective control channels leading to the control unit 10.

Subsequently, the communication for the control unit 10 to control the switches 20 is conducted by tunneling via the control channels dictated for each switch 20, as shown in FIG. 1(*e*). For example, if a switch 20 receives a packet not defined in the flow entry information, the switch 20 notifies the control unit 10 of this. At this time, the switch 20 conducts the notification by tunneling via the control channel. Also, the control unit 10 that has received the notification generates new flow entry information and transmits the information to the switch, at which time the control unit 10 transmits the flow entry information by tunneling via the control channel. The packet exchanged between the control unit 10 and the switch 20 by tunneling via the control channel is hereinafter referred to as the "tunnel packet".

The control unit 10 periodically updates topology information. For example, after a certain period has passed since the control unit 10 started generating the request packet initially, the control unit deletes the topology information and returns the process to its initial state. Next, the control unit 10 once again starts request packet generation and after generating new topology information based on a reply packet collected, transmits a setup packet to each switch. The control unit 10 repeats the sequence. Even if the interswitch connection relationships are modified by periodical regeneration of topology information, the modifications can be included in the topology information.

The request packet, the reply packet, the setup packet, and the tunnel packet are referred to as "specific packets". Processing that the switch 20 performs upon the specific packets differs from that of data packets transferred between switches. Upon receiving a data packet exchanged between terminals (not shown), the switch 20 transfers the data packet in accordance with the flow entry information, and if a flow of the data packet is not defined in the flow entry information, notifies the control unit 10 of this fact. The switch 20 conducts no such processing upon the specific packets. Instead, the switch 20 conducts different processing, depending on whether the received packet is the request packet, the reply packet, the setup packet, or the tunnel packet. Each switch assigns priority to specific-packet processing, over data packet processing. The prioritization of specific-packet processing guarantees QoS (Quality of Service) of the communication system.

The specific packets also include an appropriate count value according to the particular number of hops from the transmission source of the packet. This count value is referred to as the "port count".

Figure 2:
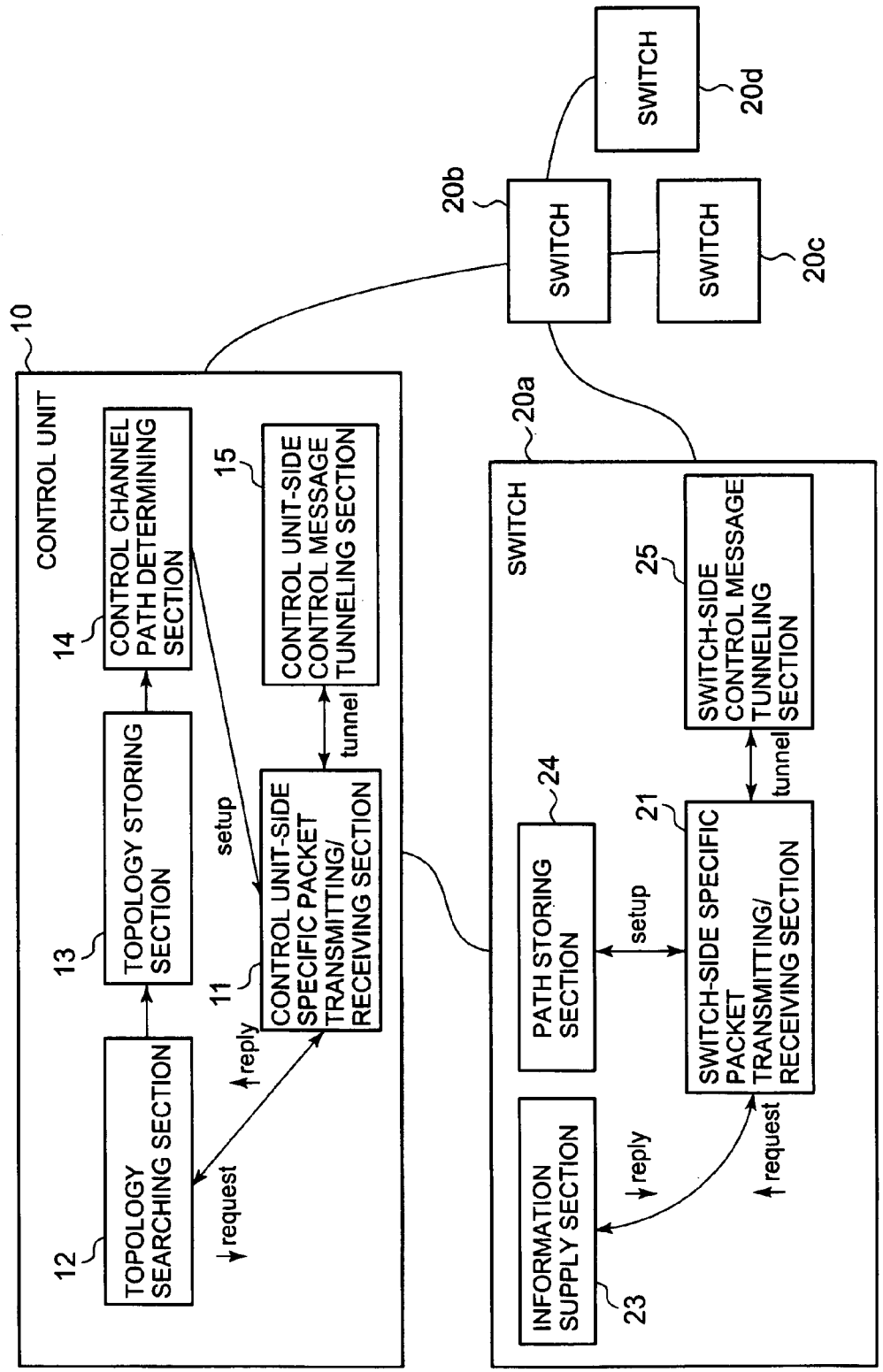
FIG. 2 depicts a block diagram showing an example of a configuration of the control unit and switches equipped in the communication system of the present invention.

FIG. 2 is a block diagram showing an example of a configuration of the control unit and switches equipped in the communication system of the present invention. While FIG. 2 shows the example in which the communication system has four switches, 20*a* to 20*d*, this example does not limit the number of switches and the topology thereof. In addition, although two switches, 20*a* and 20*b*, are connected to the control unit 10 in the example of FIG. 2, the number of switches connected to the control unit 10 may be one or three or more; the control unit 10 needs only to have at least one switch connected thereto.

The control unit 10 includes a control unit-side specific packet transmitting/receiving section 11, a topology searching section 12, a topology storing section 13, a control channel path determining section 14, and a control unit-side control message tunneling section 15.

The control unit-side specific packet transmitting/receiving section 11 (hereinafter, referred to simply as the specific packet transmitting/receiving section 11) transmits and receives specific packets. More specifically, the specific packet transmitting/receiving section 11 transmits a request packet and a setup packet, and receives a reply packet. The specific packet transmitting/receiving section 11 further transmits and receives a tunnel packet.

The specific packet transmitting/receiving section 11, upon receiving the reply packet from a switch, outputs the reply packet to the topology searching section 12. The specific packet transmitting/receiving section 11, upon receiving the tunnel packet from a switch, outputs the tunnel packet to the control unit-side control message tunneling section 15.

The request packet, setup packet, and tunnel packet that the specific packet transmitting/receiving section 11 transmits are sequentially transferred to the switches on the path by source routing, and reach the switch to which the packet is addressed. The topology searching section 12 that generates the request packet defines an output port of the control unit 10 itself and those of each switch on the path down to the destination switch, sequentially in the request packet, and the specific packet transmitting/receiving section 11 transmits the request packet from the port of the control unit 10 itself that is first defined in the list of output ports. The control channel path determining section 14 that generates the setup packet defines the output port of the control unit 10 itself and those of each switch on the control channel down to the destination switch, sequentially in the setup packet, and the specific packet transmitting/receiving section 11 transmits the setup packet from the port of the control unit 10 itself that is first defined in the list of output ports. Similarly, the control unit-side control message tunneling section 15 that generates the tunnel packet to be sent to a switch defines the output port of the control unit 10 itself and those of each switch on the control channel down to the destination switch, sequentially in the tunnel packet, and the specific packet transmitting/ receiving section 11 transmits the tunnel packet from the port of the control unit 10 itself that is first defined in the list of output ports. Source routing will be described later herein.

Hereinafter, it will be described for convenience' sake that ports are defined in the specific packet. More specifically, however, information that identifies the ports of the control unit 10 and each switch is defined in the specific packet, and port identification numbers, for example, are the information. The output port list is therefore a list of port identification information. An example of using numbers (port identification numbers) as the port identification information, is taken in the following description.

The topology searching section 12 specifies the undetected connection destination port, then generates the request packet, and makes the specific packet transmitting/receiving section 11 transmit the request packet. When the reply packet that has been transmitted from a switch is input as a reply to the request packet, the topology searching section 12 also generates topology information from the reply packet and stores the information into the topology storing section 13. The topology searching section 12 repeats this sequence until the searching section 12 has become unable to specify the undetected connection destination port from the topology information.

The topology searching section 12 initially selects the port of the control unit 10 itself that is linked up, as the undetected connection destination port. The topology searching section 12 next defines the port that has been selected as the undetected connection destination port, in the request packet as the output port. The topology searching section 12 also defines a length of the output port list (i.e., the number of defined output ports) and an initial value of the port count. In this case, the length of the output port is 1 since only the linked-up port of the control unit 10 itself is the output port. If a plurality of ports exist as undetected connection destination ports, the topology searching section 12 generates the request packet for each undetected connection destination port. That is, one undetected connection destination port corresponds to one request packet. The specific packet transmitting/receiving section 11 transmits each request packet from the port defined in the request packet.

In addition, upon receiving the reply packet and generating topology information, the topology searching section 12 refers to the topology information and specifies a port unknown about to which of any linked-up switch ports defined in the topology information the port is connected, as an undetected connection destination port. The topology searching section 12 further specifies the path from the control unit 10 to the switch having the undetected connection destination port of interest, from the generated topology information. The topology searching section 12 defines sequentially in the request packet the appropriate output ports of the control unit 10 itself and each switch according to the particular path. The topology searching section 12 also defines the length of the output port list (i.e., the number of defined output ports) and an initial value of the port count, in the request packet. In this case, the topology searching section 12 also generates the request packet for each undetected connection destination port. The specific packet transmitting/receiving section 11 transmits each request packet from the first port defined in the request packet.

The topology searching section 12 generates the topology information based on the reply packets obtained from each switch as the replies to each request packet. Each reply packet includes, in addition to the information indicating the linked-up port of the switch which has transmitted the reply packet, the information identifying the switch, and port information on the switch which has received the request packet causing the transmission of the reply packet. The topology searching section 12 identifies that the port of the reply packet transmission source switch, this port being the port of the switch that has been used to receive the request packet, is connected to the undetected connection destination port corresponding to the request packet, and adds the interconnection relationship between the two ports, to the topology information.

A start of request packet creation by the topology searching section 12 starts a succession of processes by the control unit 10, namely, request packet transmission, reply packet reception, topology information creation, and setup packet transmission. The topology searching section 12 periodically deletes the topology information, then starts the creation of a request packet, and thus starts the successive processes.

The topology storing section 13 is a device that stores the topology information.

The control channel path determining section 14 refers to completed topology information and determines independent control channels on a switch-by-switch basis. This control channel determining method is not limited. For example, the control channel path determining section 14 may use Dijkstra's algorithm to calculate the shortest path to the switch and determine this path as the control channel. The control channel path determining section 14 also generates a setup packet for each switch. At this time, the control channel path determining section 14 defines an output port of the control unit 10 itself and those of each switch on the control channel to the setup packet destination switch, sequentially in the setup packet. The control channel path determining section 14 further defines the length of the output port list (i.e., the number of defined output ports) and an initial value of the port count, in the setup packet. After this, the control channel path determining section 14 makes the specific packet transmitting/receiving section 11 transmit the setup packet.

The control unit-side control message tunneling section 15 (hereinafter, referred to simply as the control message tunneling section 15) transmits and receives, by means of tunneling, control messages exchanged between the control unit 10 and switches. That is, the control message tunneling section 15 encodes a control message (e.g., flow entry information) to be transmitted to a switch, and generates an encapsulated tunnel packet. At this time, the control message tunneling section 15 defines an output port of the control unit 10 itself and those of each switch on the control channel to the tunnel packet destination switch, sequentially in the tunnel packet. The control message tunneling section 15 further defines the length of the output port list and an initial value of the port count, in the tunnel packet. After this, the control message tunneling section 15 makes the specific packet transmitting/receiving section 11 transmit the tunnel packet.

In addition, if the specific packet transmitting/receiving section 11 receives the tunnel packet from the switch and then outputs the tunnel packet to the control message tunneling section 15, the control message tunneling section 15 decapsulates the control message included in the tunnel packet and further decodes the control message.

While an example having an initial port count value of 0 is described below in the present exemplary embodiment, the initial value of the port count may be other than 0.

The specific packet transmitting/receiving section 11, the topology searching section 12, the topology storing section 13, the control channel path determining section 14, and the control message tunneling section 15 may each be realized independently.

The specific packet transmitting/receiving section 11, the topology searching section 12, the control channel path determining section 14, and the control message tunneling section 15 may likewise be realized by a CPU of a computer operating in accordance with a program used for the control unit. In this case, a program storage device (not shown) of the computer, for example, may store the control unit-use program, and the CPU may load the program and operate as the specific packet transmitting/receiving section 11, the topology searching section 12, the control channel path determining section 14, and the control message tunneling section 15, in accordance with the program.

Next, switch configurations are described below. The switches 20a to 20d are substantially of the same configuration. The following describes the switch 20a by way of example.

The switch 20a includes a switch-side specific packet transmitting/receiving section 21, an information supply section 23, a path storing section 24, and a switch-side control message tunneling section 25.

The switch-side specific packet transmitting/receiving section 21 (hereinafter, referred to simply as the specific packet transmitting/receiving section 21) transfers, receives, and transmits specific packets.

The specific packet transmitting/receiving section 21, upon receiving a specific packet, compares the length of the list of output ports defined in the specific packet, with the port count, and determines whether the switch 20a itself is the destination of the specific packet. In the present exemplary embodiment, since the initial value of the port count is 0, if a value obtained by adding 1 to the port count in the received specific packet is the same as the length of the output port list, the specific packet transmitting/receiving section 21 may determine that the switch 20a itself is the destination of the specific packet. If the value obtained by adding 1 to the port count in the received specific packet is smaller than the length of the output port list, the specific packet transmitting/receiving section 21 may determine the switch 20a itself not to be the destination of the specific packet. The length of the output port list is the number of output ports defined in the specific packet. Upon determining the switch 20a itself not to be the destination of the specific packet, the specific packet transmitting/receiving section 21 updates, of all ports defined in the output port list of the specific packet, only the port dictated from the port count, into the port of the switch 20a itself where the specific packet was received. In the present exemplary embodiment, if the value of the port count defined in the specific packet is "k", the (k+1)th port defined in the output port list is updated into the port of the switch 20a itself where the specific packet was received. Additionally, the specific packet transmitting/receiving section 21 identifies the (k+2)th port defined in the output port list, that is, the port immediately following the updated one. This port is where the specific packet is to be transmitted from the switch 20a itself. Furthermore, the specific packet transmitting/receiving section 21 adds 1 to the value of the port count defined in the specific packet. The specific packet transmitting/receiving section 21 next transmits the specific packet from the identified port. The specific packet with the incremented port count is consequently transferred.

After determining the switch 20a itself to be the destination of the specific packet, if the specific packet is a request packet, the specific packet transmitting/receiving section 21 outputs the request packet to the information supply section 23; if the specific packet is a setup packet, the specific packet transmitting/receiving section 21 outputs the setup packet to the path storing section 24; or if the specific packet is a tunnel packet, the specific packet transmitting/receiving section 21 outputs the tunnel packet to the switch-side control message tunneling section 25.

Furthermore, the specific packet transmitting/receiving section 21 transmits reply packets. As described later herein, the information supply section 23 that generates a reply packet defines the output ports of each switch on the path to the control unit 10, sequentially in the reply packet. the specific packet transmitting/receiving section 21 transmits the reply packet from the port of the switch 20a itself that is first defined in the output port list.

The information supply section 23, upon a request packet being input thereto from the specific packet transmitting/receiving section 21, creates a packet that, as the reply packet, includes the information indicating the linked-up port of the switch 20a itself, the information indicating the port of the switch 20a that has been used to receive the request packet, and the information identifying the switch 20a. The information supply section 23 further defines sequentially in the reply packet the output ports of each switch on the path extending from the switch itself to the control unit 10. The following describes how the output port list is dictated. That is, the information supply section 23 updates the last port in the output port list, defined in the request packet that has been input, into the port of the switch that has been used to receive the request packet. Additionally, the information supply section 23 reverses the order in which the ports were rearranged in the updated output port list, and defines the rearranged output port list in the reply packet. The information supply section 23 also defines the length of the output port list and the initial value of the port count, in the reply packet, and then makes the specific packet transmitting/receiving section 21 transmit the reply packet. As a result, the switch transmits, from the port where the request packet has been received, the reply packet as the reply to the request packet.

The path storing section 24, upon a setup packet being input thereto from the specific packet transmitting/receiving section 21, stores the path that functions as the control channel extending from the setup packet to the control unit 10. More specifically, the path storing section 24 updates the last port in the output port list defined in the setup packet that has been input, into the port of the switch that has been used to receive the setup packet. Additionally, the path storing section 24 reverses the order in which the ports were rearranged in the updated output port list, and stores the rearranged output port list as the information that indicates the path information as the control channel.

The switch-side control message tunneling section 25 (hereinafter, referred to simply as the control message tunneling section 25) transmits and receives, by tunneling, the control messages exchanged between the control unit 10 and switches. In other words, the control message tunneling section 25 encodes a control message to be transmitted to the control unit 10 (e.g., a message indicating that a packet not defined in flow entry information has been received), and generates an encapsulated tunnel packet. At this time, the control message tunneling section 25 reads from the path storing section 24 the output port list representing the control channel to the control unit 10, and defines this output port list in the tunnel packet. The control message tunneling section 25 further defines the length of the output port list and the initial value of the port count, in the tunnel packet. After this, the control message tunneling section 25 makes the specific packet transmitting/receiving section 21 transmit the tunnel packet.

In addition, upon the tunnel packet being input to the control message tunneling section 25 from the specific packet transmitting/receiving section 21, the control message tunneling section 25 decapsulates the control message (e.g., flow entry information) included in the tunnel packet, and decodes the control message.

The specific packet transmitting/receiving section 21, the information supply section 23, the path storing section 24, and the control message tunneling section 25 may each be realized independently.

The specific packet transmitting/receiving section 21, the information supply section 23, the path storing section 24, and the control message tunneling section 25 may likewise be realized by a CPU of a computer operating in accordance with a program used for the packet transfer unit. In this case, a program storage device (not shown) of the computer, for example, may store the packet transfer unit-use program, and the CPU may load the program and operate as the specific packet transmitting/receiving section 21, the information supply section 23, the path storing section 24, and the control message tunneling section 25, in accordance with the program.

Next, source routing in the present invention is described below. Source routing is a packet transfer method in which a node to operate as a transmission source defines a communications path in a packet and a relay node transfers the packet in accordance with the communications path defined therein. In source routing, there is no need for the relay node to store previously provided path information. The communication system of the present invention defines in a specific packet the output port list representing a sequential array of output ports from which individual nodes are to transmit the specific packet. The control unit 10 and each switch implement source routing by transmitting specific packets from the ports defined in the output port list. The control unit 10 and each switch determine at what position in the output port list the output port relating to the local node is defined, by the port count. The following describes a more specific example of source routing.

Figure 3:
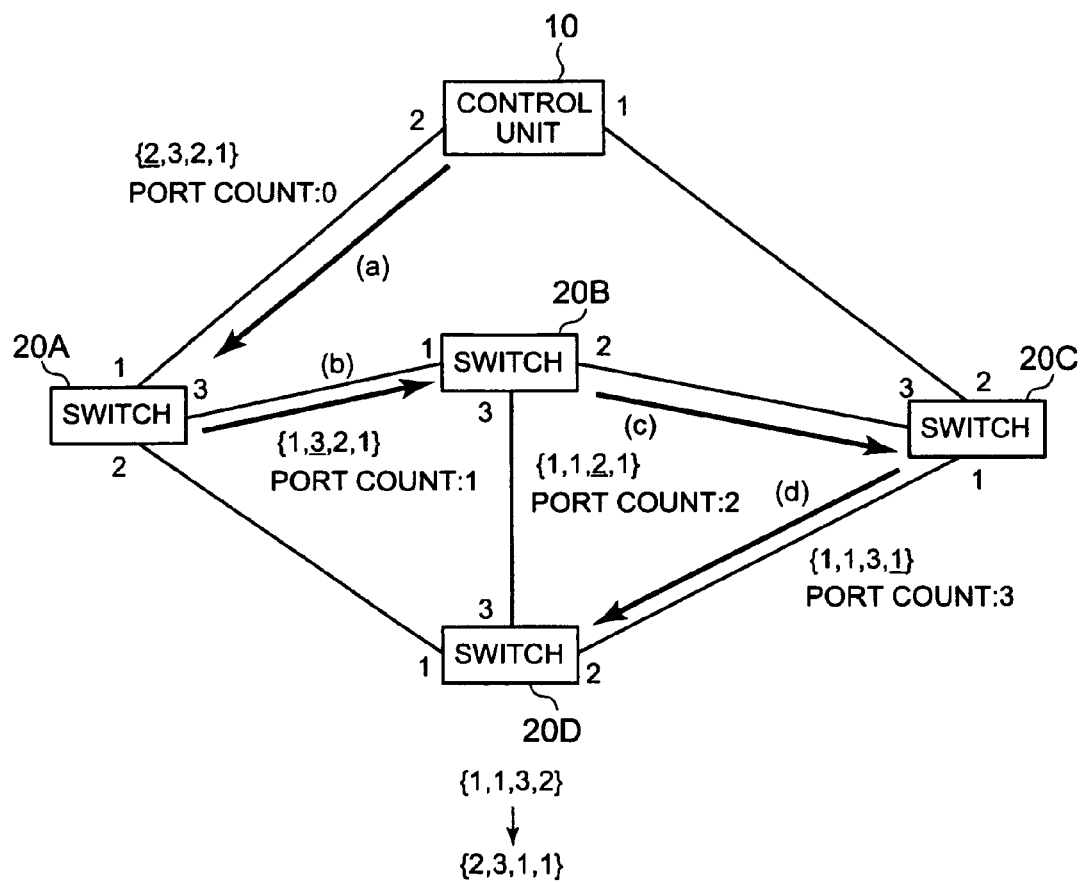
FIG. 3 depicts an explanatory diagram showing an example of source routing.

FIG. 3 is an explanatory diagram showing an example of source routing applied when the control unit transmits a setup packet to switches. For simplicity of description, however, the topology of the switches shown in FIG. 3 is made different from the topology shown in FIG. 2. The switches 20A to 20D in FIG. 3 are substantially of the same configuration as that of the switches 20a to 20d in FIG. 2. In addition, the reference numbers shown near the control unit 10 and switches 20A to 20D in FIG. 3 denote port identification numbers assigned to each unit. The port whose port identification number is "n" is expressed with "#n" in the following description.

In this example, the control unit 10 transmits the setup packet to the switch 20D, the destination. In the example, the control unit 10 first sets the port count to have an initial value of 0 and transmits the setup packet with an output port list of {2, 3, 2, 1} defined therein. Since the first port number in this output port list is "2", the control unit 10 transmits the setup packet from port #2 of the control unit 10. This state is shown in FIG. 3 as condition (a).

The switch 20A uses port #1 to receive the setup packet. Since the value of the port count is 0, the switch 20A next updates the first port identification number in the output port list into the port identification number of port #1 where the setup packet has been received. In addition, since the value of the port count is 0, the switch 20A also determines that the port from which to transmit the setup packet is defined at the second position in the output port list, and identifies port identification number "3" defined in the second position. After this, the switch 20A updates the value of the port count from 0 to 1 and transmits the setup packet from port #3 of the switch 20A. The output port list that has thus been defined in the setup packet is {1, 3, 2, 1}. This state is shown in FIG. 3 as condition (b).

The switch 20B uses port #1 to receive this setup packet. Since the value of the port count is 1, the switch 20B next updates the second port identification number in the output port list into the port identification number of port #1 where the setup packet has been received. In addition, since the value of the port count is 1, the switch 20B also determines that the port from which to transmit the setup packet is defined at the third position in the output port list, and identifies port identification number "2" defined in the third position. After this, the switch 20B updates the value of the port count from 1 to 2 and transmits the setup packet from port #2 of the switch 20B. The output port list that has thus been defined in the setup packet is {1, 1, 2, 1}. This state is shown in FIG. 3 as condition (c).

The switch 20C uses port #3 to receive this setup packet. Since the value of the port count is 2, the switch 20C next updates the third port identification number in the output port list into the port identification number of port #3 where the setup packet has been received. In addition, since the value of the port count is 2, the switch 20C also determines that the port from which to transmit the setup packet is defined at the fourth position in the output port list, and identifies port identification number "1" defined in the fourth position. After this, the switch 20C updates the value of the port count from 2 to 3 and transmits the setup packet from port #1 of the switch 20C. The output port list that has thus been defined in the setup packet is {1, 1, 3, 1}. This state is shown in FIG. 3 as condition (d).

The switch 20D uses port #2 to receive this setup packet. Since the value of the port count is 3 and the number of port identification numbers in the output port list is four, the switch 20D next determines that the switch 20D itself is the destination. The switch 20D also updates the last port identification number "1" in the {1, 1, 3, 1} output port list of the setup packet, into the port identification number of port #2 where the setup packet has been received. The output port list becomes {1, 1, 3, 2} as a result. The switch 20D rearranges the output port list in reverse order, and stores the rearranged output port list of {2, 3, 1, 1} as the output port list that represents the control channel leading to the control unit 10.

While the example in which the control unit transmits a setup packet to switches has been described, operation of the switches 20A to 20C is also substantially the same as when the control unit transmits a tunnel packet or a request packet to the switch 20D only. This results in the switch 20D using port #2 to receive the tunnel packet or request packet in which the output port list of {1, 1, 3, 1} is defined.

Upon receiving the tunnel packet, however, the switch 20D can skip processing the output port list in the tunnel packet.

The following describes the way the switch 20D operates upon receiving a request packet. Since the value of the port count is 3 and the number of port identification numbers in the output port list is four, the switch 20D determines that the switch 20D itself is the destination. The switch 20D also updates the last port identification number in the {1, 1, 3, 1} output port list defined in the request packet, into the port identification number of port #2 where the request packet has been received. The output port list becomes {1, 1, 3, 2} as a result. The switch 20D rearranges the output port list in reverse order and after defining the rearranged output port list of {2, 3, 1, 1} in a reply packet, transmits the reply packet from port #2 corresponding to the first position in {2, 3, 1, 1}. Operation of the switch upon receiving a reply packet is substantially the same as upon receiving a setup packet or a tunnel packet, and this reply packet reaches the control unit 10.

The example in which the control unit 10 transmits the specific packets addressed to the switch 20D has been described and shown. For packets addressed to other switches, each switch also operates in substantially the same manner as that described above.

In addition, when each switch defines in a tunnel packet the output port list prestored as the control channel leading to the control unit 10 and transmits the tunnel packet, other switches operate similarly to the above and sequentially transfer the tunnel packet to the control unit 10.

Description was given in FIG. 3 taking the initial port count value of 0 by way of example. A method for each switch to determine what number port identification number in the output port list is to be updated, or a method for each switch to determine from which port the specific packet is to be transferred can be preset according to the particular initial value of the port count. A method in which the switch that has received the specific packet determines whether the switch itself is the destination can also be preset according to the particular initial value of the port count.

Figure 4:
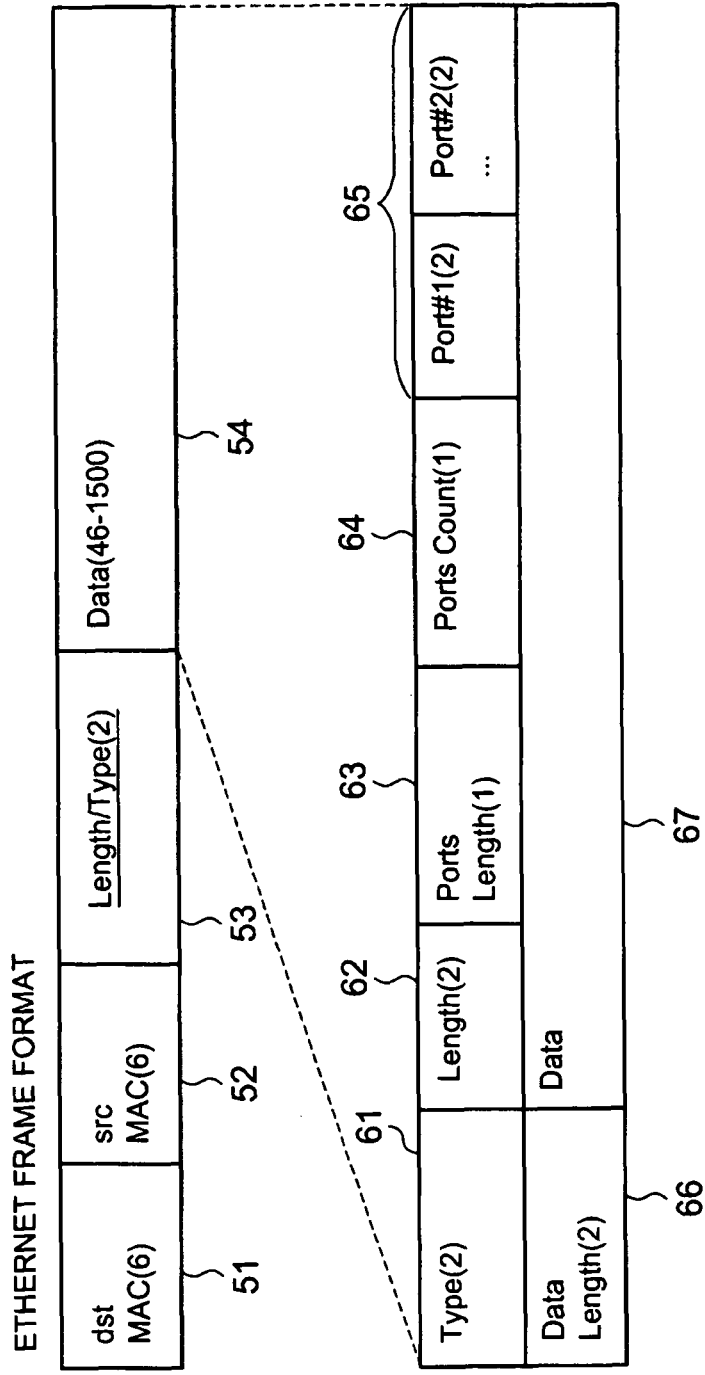
FIG. 4 depicts an explanatory diagram showing a format of a specific packet by way of example.

Next, examples of a format of the specific packets are described below. FIG. 4 shows an example of a specific-packet format. The example shown in FIG. 4 relates to realizing a specific packet in the format of the Ethernet frame (Ethernet: registered trademark). The values shown in parenthesized form in FIG. 4 denote the number of bytes. A destination MAC address 51 and a source MAC address 52 are provided in the Ethernet frame format. The communication system of the present invention, however, does not use these addresses to send/receive the specific packets. Instead, the communication system of the invention transmits the specific packets by source routing, as described in the present exemplary embodiment. In the specific packets of the Ethernet frame format, a value indicating that the packet is a specific packet is stored into type information 53. When the control unit 10 or each switch generates a specific packet, the value indicating that the packet is a specific packet is stored into the type information 53. In addition, when the control unit 10 or each switch receives a packet, each determines the received packet to be a specific packet, subject to the fact that the value indicating that the packet is a specific packet is stored within the type information 53.

Data 54 of the Ethernet frame format includes a type code 61 that identifies the kind of specific packet. The data 54 also includes first data length 62, length 63 of the output port list, a port count 64, the output port list 65, second data length 66, and data 67 of the specific packet. To discriminate from the type information 53 in the Ethernet frame format, the type code 61 identifying the kind of specific packet will be hereinafter referred to simply as the type 61. In addition, to discriminate from the data 54 in the Ethernet frame format, data 67 of the specific packet will be referred to as the specific packet data 67. Data length of entire information subsequent to the first data length 62 (shown as "Length" in FIG. 4) is stored into the first data length 62. Data length of entire information subsequent to the second data length 66 (shown as "DataLength" in FIG. 4) is stored into the second data length 66.

The length 63 (shown as "PortsLength" in FIG. 4) of the output port list is the number of ports included in the output port list. More specifically, the length 63 is the number of port identification numbers included in the output port list.

The port count 64 (shown as "PortsCount" in FIG. 4) is a count value dictated by the number of hops from the transmission source of the specific packet.

The port identification numbers are stored in an arranged form within the output port list 65.

Examples of the information included in the data 54 of the Ethernet frame format are described below for each kind of specific packet. However, description is omitted of the first data length 62, the output port list length 63, the port count 64, the output port list 65, and the second data length 66.

Figure 5:
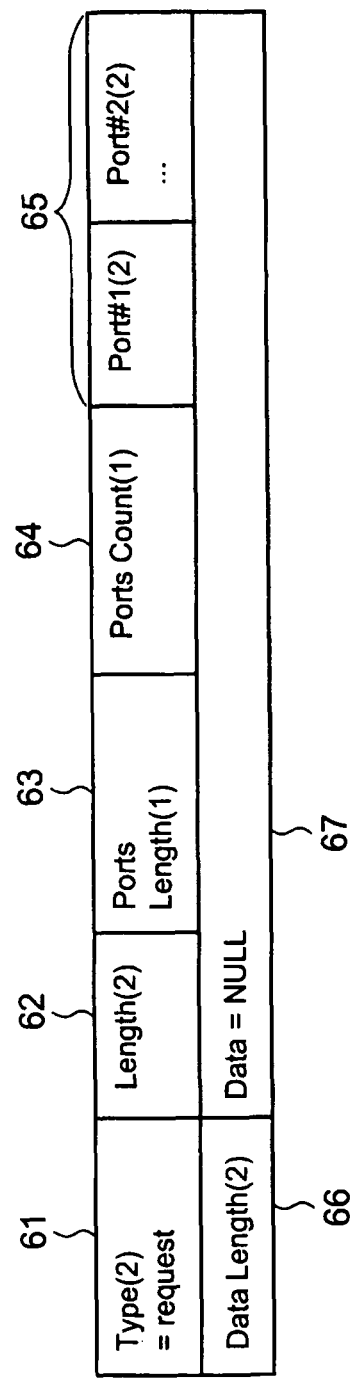
FIG. 5 depicts an explanatory diagram showing an example of information included in a request packet.

FIG. 5 is an explanatory diagram showing an example of the information included in a request packet. A value indicating that the packet is a request packet is stored into the type 61. The control unit 10, upon generating a request packet, stores the value indicating that the packet is a request packet, into the type 61. In addition, each switch, upon receiving a packet, determines the received packet to be a request packet, subject to the fact that the value indicating that the packet is a request packet is stored within the type 61.

The specific packet data 67 is NULL for request packets.

Figure 6:
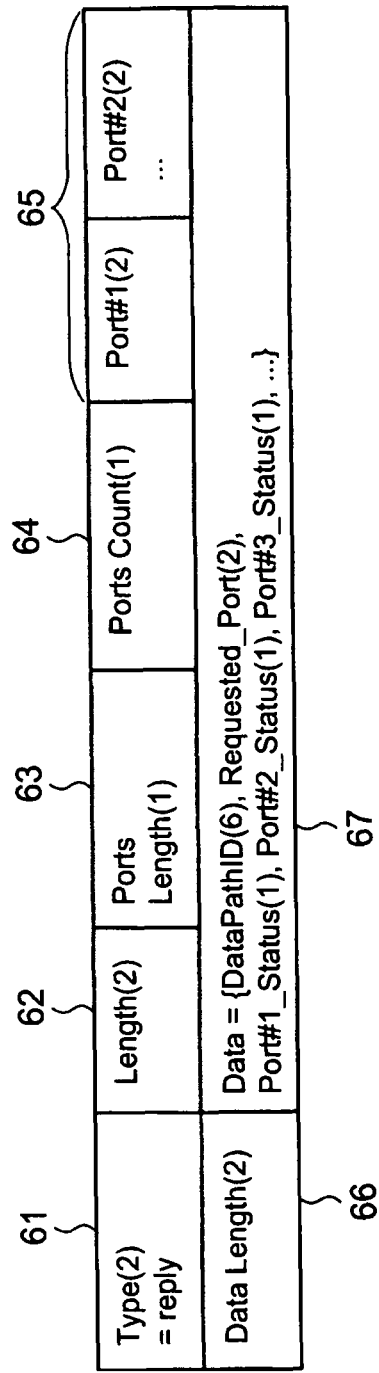
FIG. 6 depicts an explanatory diagram showing an example of information included in a reply packet.

FIG. 6 is an explanatory diagram showing an example of the information included in a reply packet. A value indicating that the packet is a reply packet is stored into the type code 61. Each switch, upon generating a reply packet, stores the value indicating that the packet is a reply packet, into the type code 61. In addition, the control unit 10, upon receiving a packet, determines the received packet to be a reply packet, subject to the fact that the value indicating that the packet is a reply packet is stored within the type code 61.

For the reply packet, information denoting a port that is linked up, information denoting the port of the switch that has been used to receive the request packet, and information identifying the switch that is to transmit the reply packet are stored into the specific packet data 67. During reply packet creation, the switch to transmit the reply packet stores the three kinds of information into the specific packet data 67. In the example of FIG. 6, "DataPathID" corresponds to the switch identification information. Also, "Requested_Port" corresponds to the request packet receiving port. In addition, "Port#n_Status" represents whether the port with a port identification number of "n" is linked up. For example, the switch can define a value of "Port#n_Status" for each port so that "Port#n_Status" equals 1 for the port that is linked up, and so that "Port#n_Status" equals 0 for other ports that are not linked up. The port that is linked up can then be located from the set of "Port#n_Status" values defined on a port-by-port basis. However, other representing methods may be used to define the port that is linked up.

Figure 7:
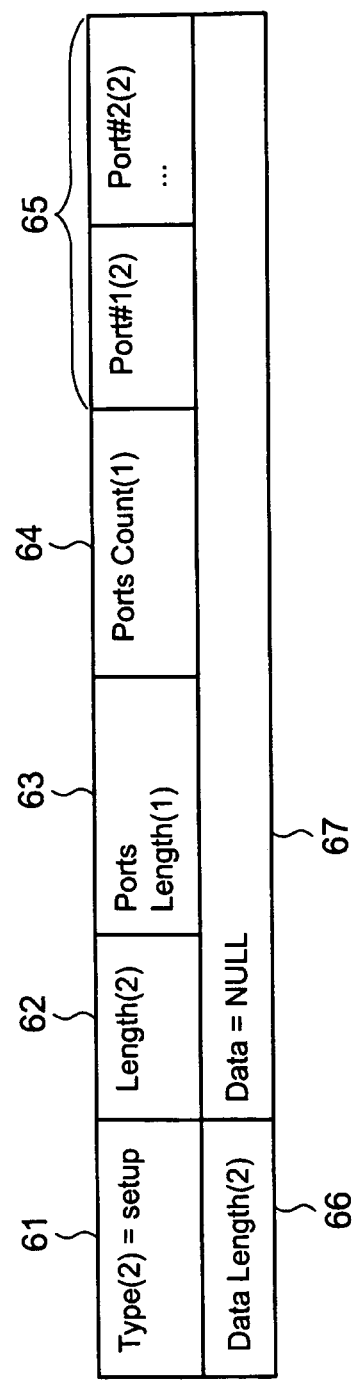
FIG. 7 depicts an explanatory diagram showing an example of information included in a setup packet.

FIG. 7 is an explanatory diagram showing an example of the information included in a setup packet. A value indicating that the packet is a setup packet is stored into the type code 61. The control unit 10, upon generating a setup packet, stores the value indicating that the packet is a setup packet, into the type code 61. In addition, each switch, upon receiving a packet, determines the received packet to be a setup packet, subject to the fact that the value indicating that the packet is a setup packet is stored within the type code 61.

The specific packet data 67 is NULL for setup packets.

Figure 8:
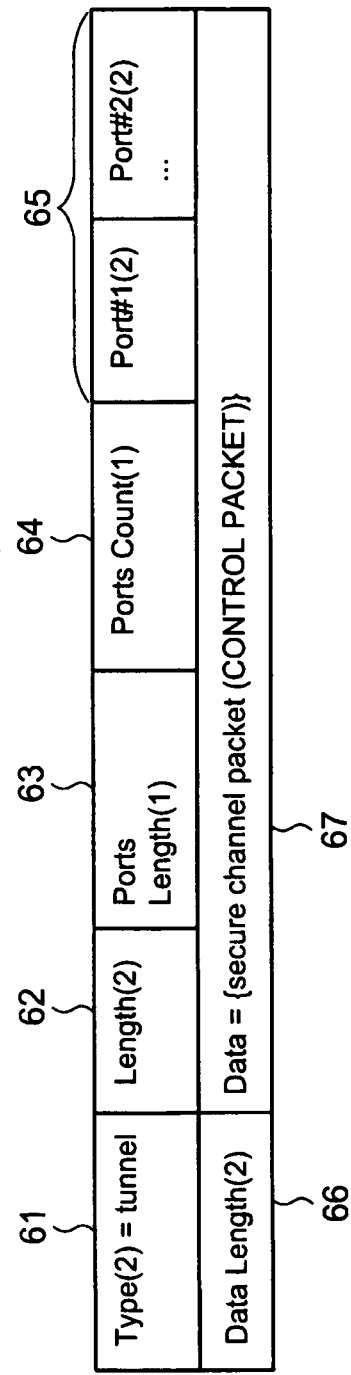
FIG. 8 depicts an explanatory diagram showing an example of information included in a tunnel packet.

FIG. 8 is an explanatory diagram showing an example of the information included in a tunnel packet. A value indicating that the packet is a tunnel packet is stored into the type 61. The control unit 10 or each switch, upon generating a tunnel packet, stores a value indicating that the packet is a tunnel packet, into the type code 61. In addition, the control unit 10 or each switch, upon receiving a packet, determines the received packet to be a tunnel packet, subject to the fact that the value indicating that the packet is a tunnel packet is stored within the type code 61.

The tunnel packet has a control message stored into the specific packet data 67. More specifically, a control packet exchanged as the control message in a general communication system of the OpenFlow scheme is stored into the packet data 67. In the communication system of the present invention, a control message is also exchanged between the control unit and one switch, as so done in a general communication system.

The following describes operation.

FIGS. 9 to 13 are explanatory diagrams that schematically show process steps in which the control unit generates topology information and forms a control channel. Referring to the diagrams of FIGS. 9 to 13, the control unit is marked with reference symbol A for convenience' sake, and likewise, each switch with one of reference symbols B to E. A configuration of control unit A and that of each switch B to E are substantially the same as the respective configurations shown in FIG. 2. Also, numerals shown near control unit A and each switch B to E in each diagram from FIG. 9 to FIG. 13 signify port identification numbers. Additionally, the port identification numbers of the ports which have been determined to be undetected connection destinations in each diagram from FIG. 9 to FIG. 13 are each enclosed in a circle. Furthermore, in the description given below, the ports of control unit A and switches B to E may be expressed as "#n@A", "#n@B", etc., along with the reference symbols and port identification numbers of control unit A and switches B to E. The number that follows "#" denotes a port identification number, and the symbol that follows "@" identifies either the control unit or a switch. For example, "#1@A" means port #1 of the control unit 10, and "#2@B" means port #2 of switch B.

Figure 14:
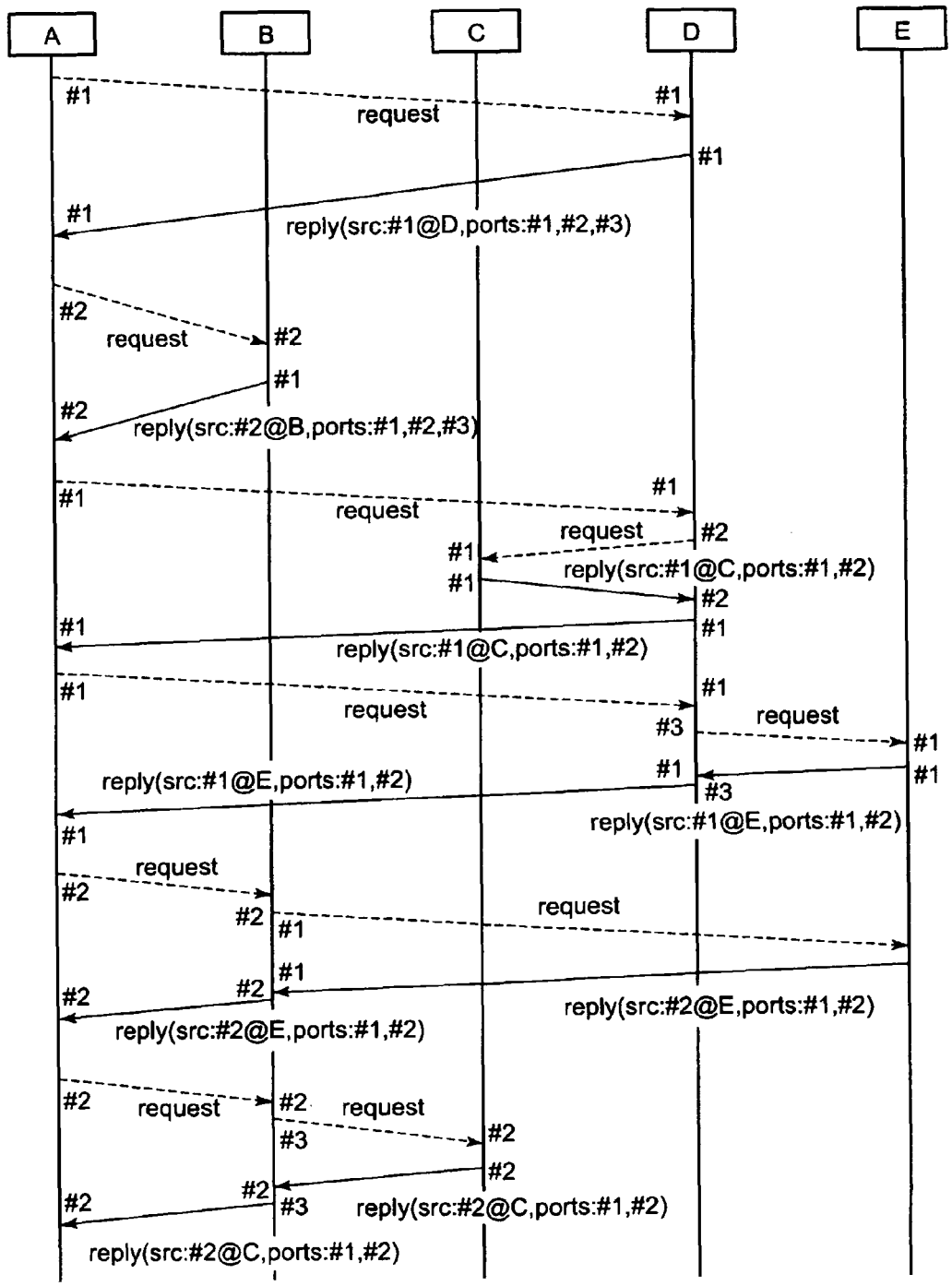
FIG. 14 depicts an explanatory diagram showing an example of process steps in which the control unit and each switch exchange a request packet and a reply packet.

FIG. 14 is an explanatory diagram showing an example of process steps in which control unit A and switches B to D exchange request packets and reply packets. Referring to FIG. 14, dashed lines with an arrow signify request packet exchanges, and solid lines with an arrow signify reply packet exchanges. Numbers shown with "#" at both ends of each arrow-marked line in FIG. 14 denote the identification numbers of the ports where the request or reply packet is transmitted or received. FIG. 14 just shows an example of ongoing request packet and reply packet exchanges, and transmission sequences of each packet are not limited to those shown in FIG. 14. In FIG. 14, for example, control unit A exchanges a request packet and a reply packet with switch D before exchanging a request packet and a reply packet with switch B, but this sequence may be reversed. Otherwise, control unit A may send request packets in parallel to both switches B and D and then receive reply packets in succession from the two switches.

Figure 9:
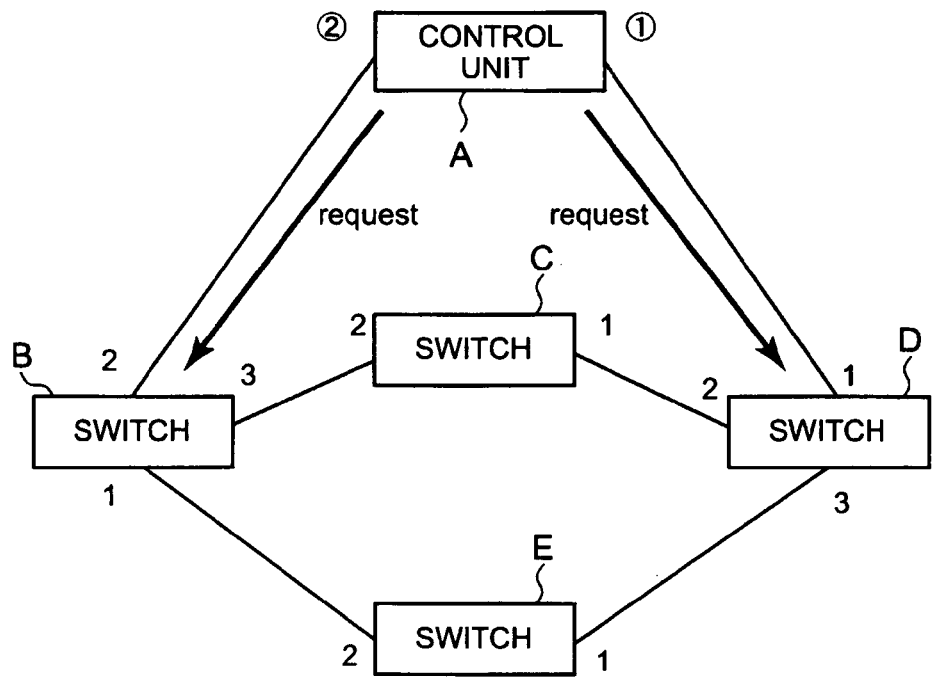
FIG. 9 depicts a schematic diagram showing a process step in which the control unit generates topology information and forms a control channel.

Under its initial state, the topology searching section 12 of control unit A selects, as undetected connection destination ports, the ports of control unit A that are linked up, these ports being unknown whether they are each connected to which port of which switch. In the present example, the topology searching section 12 selects #1@A (port #1 of control unit A) and #2@A (port #2 of control unit A), as shown in FIG. 9. The specific packet transmitting/receiving section 11 of control unit A then transmits a request packet from each of the two undetected connection destination ports, #1@A and #2@A, as shown in FIGS. 9 and 14. The topology searching section 12 defines {#1} as the source-routing output port list in the request packet transmitted from #1@A, and likewise, defines {#2} in the output port list of the request packet transmitted from #2@A.

Figure 10:
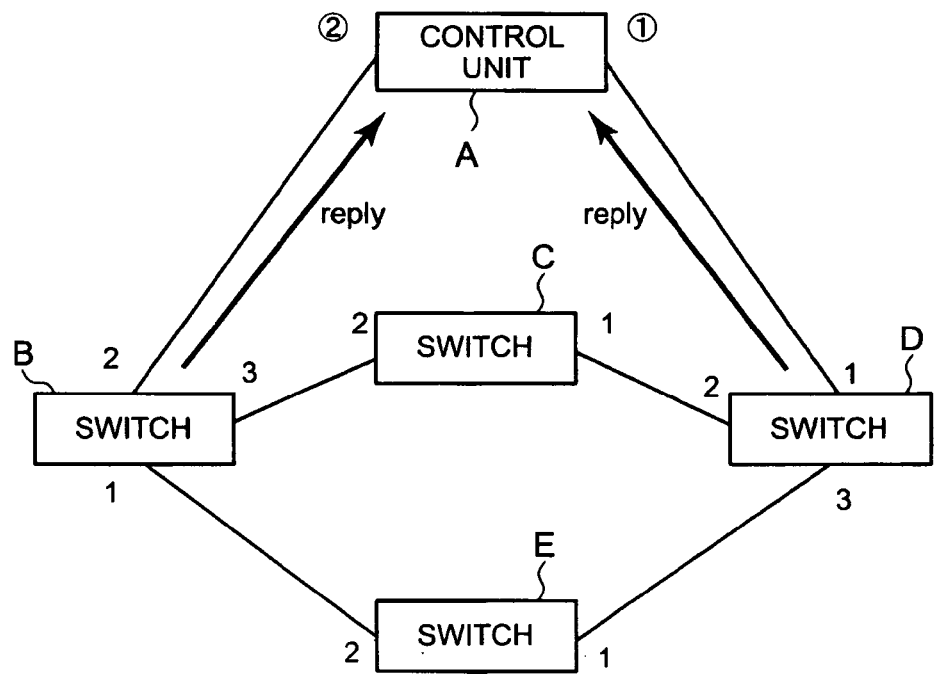
FIG. 10 depicts another schematic diagram showing a process step in which the control unit generates topology information and forms a control channel.
Figure 11:
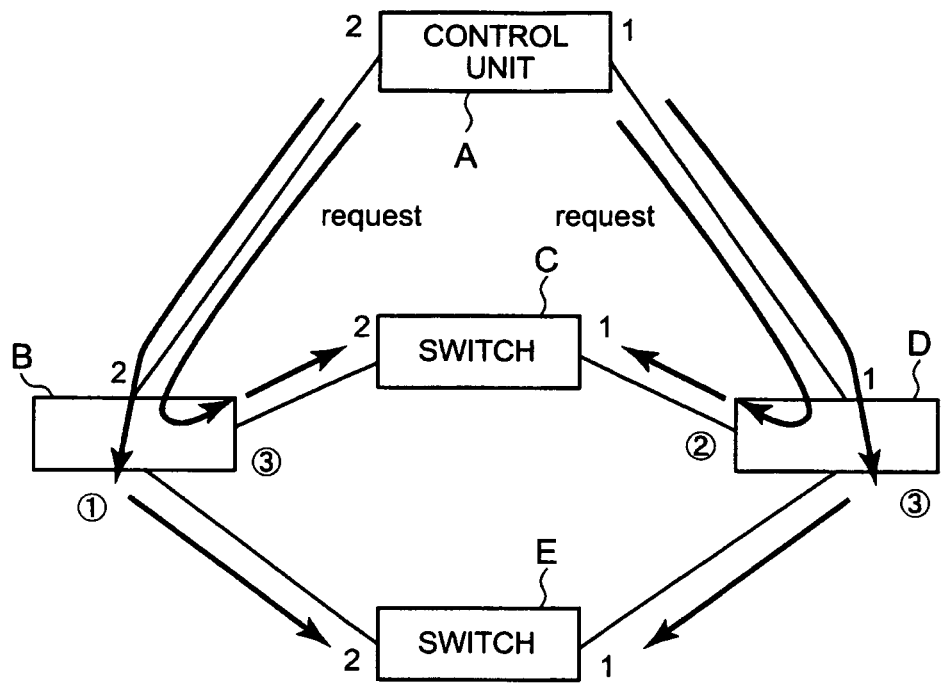
FIG. 11 depicts yet another schematic diagram showing a process step in which the control unit generates topology information and forms a control channel.
Figure 12:
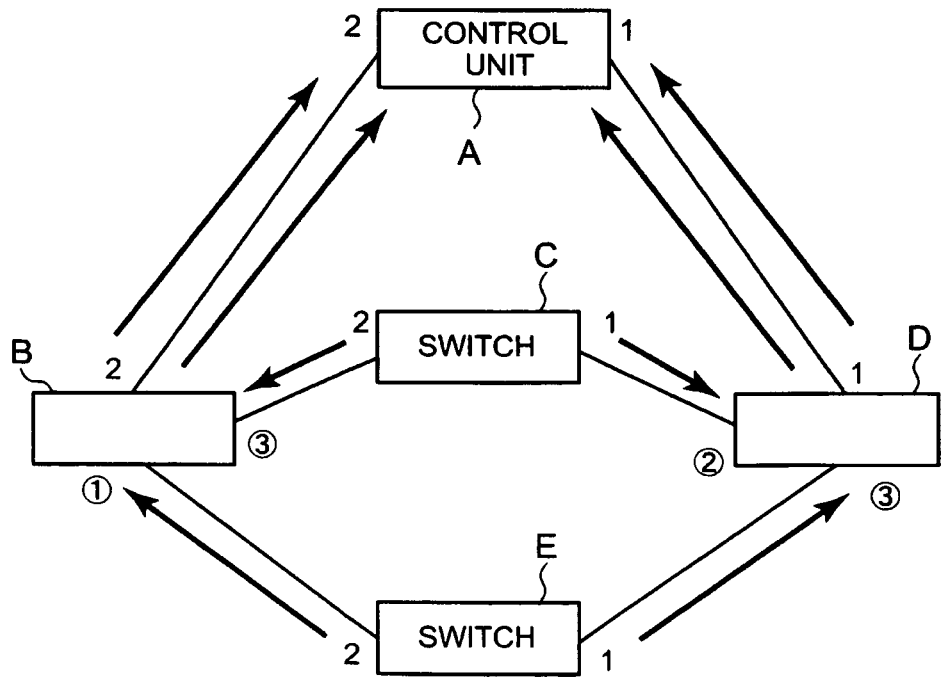
FIG. 12 depicts a further schematic diagram showing a process step in which the control unit generates topology information and forms a control channel.
Figure 13:
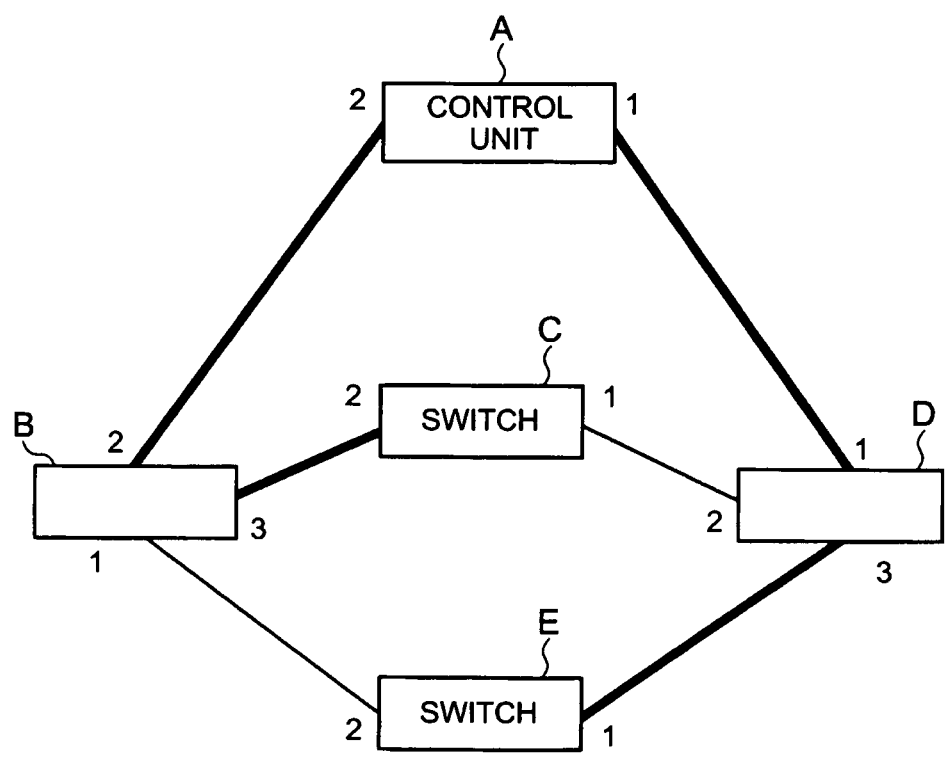
FIG. 13 depicts a further schematic diagram showing a process step in which the control unit generates topology information and forms a control channel.

The specific packet transmitting/receiving section 21 of switch D uses #1@D (port #1 of switch D) to receive the request packet that has been transmitted from port #1@A. The information supply section 23 of switch D then generates a reply packet including the information that identifies the switch D itself, the information that indicates port #1 through which the request packet has been received, and the information relating to ports linked up in switch D. At this time, the information supply section 23 defines, in the reply packet, #1, #2 and #3 as the information relating to the ports linked up in switch D. The information supply section 23 also defines {#1} as the source-routing output port list in the reply packet. This makes the specific packet transmitting/receiving section 21 of switch D transmit the reply packet from port #1@D through which the request packet has been received. This transmission state is shown in FIG. 10. This reply packet is shown as "reply(src:#1@D,ports:#1,#2,#3)" in FIG. 14.

Similarly, the specific packet transmitting/receiving section 21 of switch B uses #2@B (port #2 of switch B) to receive the request packet that has been transmitted from port #2@A. The information supply section 23 of switch B then generates a reply packet including the information that identifies the switch B itself, the information that indicates port #2 through which the request packet has been received, and the information relating to ports linked up in switch B. At this time, the information supply section 23 defines, in the reply packet, #1, #2 and #3 as the information relating to the ports linked up in switch B. The information supply section 23 also defines {#2} as the source-routing output port list in the reply packet. This makes the specific packet transmitting/receiving section 21 of switch B transmit the reply packet from port #2@B through which the request packet has been received. This transmission state is shown in FIG. 10. This reply packet is shown as "reply(src:#2@B,ports:#1,#2,#3)" in FIG. 14.

Through the port of control unit A that was used to transmit the request packet, the specific packet transmitting/receiving section 11 of control unit A receives the reply packet transmitted from a switch in reply to that request packet. The topology searching section 12 of control unit A then determines that a port of the reply packet transmission source switch, the port being that which the switch has been used to receive the request packet, will be connected to the undetected connection destination port selected prior to the transmission of the request packet. The topology searching section 12 of control unit A next stores an interconnection relationship between the two ports, as topology information into the topology storing section 13. Additionally, the topology searching section 12 of control unit A selects one of the ports of the reply packet transmission source switch as an undetected connection destination port, and generates a request packet transmitted from this undetected connection destination port. The topology searching section 12 needs only to define, in this request packet, an output port of control unit A and those of each switch forming the path to the selected, undetected connection destination port. This results in the specific packet transmitting/receiving section 11 of control unit A transmitting the request packet.

In the above example, the specific packet transmitting/receiving section 11 of control unit A receives, at port #1@A, the reply packet transmitted from port #1@D. The topology searching section 12 of control unit A then determines that port #1@D is connected to undetected connection destination port #1@A that has been selected prior to the transmission of the request packet. The topology searching section 12 of control unit A then stores this connection state into the topology storing section 13. Additionally, the topology searching section 12 of control unit A selects, from ports #1, #2, #3 of switch D which has transmitted the reply packet, ports #2 and #3 as undetected connection destination ports (see FIG. 11). The topology searching section 12 generates a request packet transmitted from undetected connection destination port #2@D. The topology searching section 12 defines, in this request packet, {#1, #2} as the output port list for source routing, and the specific packet transmitting/receiving section 11 of control unit A transmits the request packet from port #1 defined at the first position in the output port list. The specific packet transmitting/receiving section 21 of switch D receives the request packet and transfers the request packet from port #2 defined at the second position in the output port list (see FIGS. 11 and 14). The topology searching section 12 of control unit A also generates a request packet transmitted from undetected connection destination port #3@D. The topology searching section 12 defines, in this request packet, {#1, #3} as the output port list for source routing, and the specific packet transmitting/receiving section 11 of control unit A transmits the request packet from port #1 defined at the first position in the output port list. The specific packet transmitting/receiving section 21 of switch D receives the request packet and transfers the request packet from port #3 defined at the second position in the output port list (see FIGS. 11 and 14).

Similarly, control unit A receives, at port #2@A, the reply packet transmitted from port #2@B. Control unit A next determines that port #2@B is connected to undetected connection destination port #2@A, and stores this connection state. Additionally, control unit A selects, from ports #1, #2, #3 of switch B which has transmitted the reply packet, ports #1 and #3 as undetected connection destination ports (see FIG. 11). Control unit A generates a request packet transmitted from undetected connection destination port #1@B. Control unit A defines, in this request packet, {#2, #1} as the output port list for source routing, and transmits the request packet from port #2 defined at the first position in the output port list. Switch B receives the request packet and transfers the request packet from port #1 defined at the second position in the output port list (see FIGS. 11 and 14). Control unit A also generates a request packet transmitted from undetected connection destination port #3@B. Control unit A defines, in this request packet, {#2, #3} as the output port list for source routing, and transmits the request packet from port #2 defined at the first position in the output port list. Switch B receives the request packet and transfers the request packet from port #3 defined at the second position in the output port list (see FIGS. 11 and 14).

The specific packet transmitting/receiving section 21 of switch C uses port #1@C to receive the request packet that has been transferred from port #2@D, and uses port #2@C to receive the request packet that has been transferred from port #3@B. The information supply section 23 of switch C then generates, for each port that has been used to receive the request packets, a reply packet that includes the information identifying switch C itself, the information indicating the port through which the request packet has been received, and the information on ports linked up in switch C. At this time, the information supply section 23 defines, in each reply packet, #1 and #2 as the information relating to the ports linked up in switch C. In the present example, the information supply section 23 defines {1, 1} as the output port list in the reply packet corresponding to the request packet transferred from port #2@D. The specific packet transmitting/receiving section 21 of switch C transmits the reply packet from port #1, then switch D transmits this reply packet from port #1, and the reply packet reaches control unit A (see FIGS. 12 and 14). This reply packet is shown as "reply(src:#1@C,ports:#1,#2)" in FIG. 14. Likewise, switch C defines {2, 2} as the output port list in the reply packet corresponding to the request packet transferred from port #3@B. Switch C transmits the reply packet from port #2, then switch B transmits this reply packet from port #2, and the reply packet reaches control unit A (see FIGS. 12 and 14). This reply packet is shown as "reply(src:#2@C,ports:#1,#2)" in FIG. 14.

The two reply packets "reply(src:#1@C,ports:#1,#2)" and "reply(src:#2@C,ports:#1,#2)" that control unit A receives, both include the information indicating that ports #1, #2 exist as those of switch C. The reply packets that control unit A receives, therefore, overlap in content. Control unit A can generate topology information with such overlapping information left. Alternatively, control unit A may delete part of the overlapping information to remove the overlap before generating topology information.

Switch E operates similarly to switch C. That is, the specific packet transmitting/receiving section 21 of switch E uses port #1@E to receive the request packet that has been transferred from port #3@D, and uses port #2@E to receive the request packet that has been transferred from port #1@B. The information supply section 23 of switch E then generates, for each receiving port of the request packets, a reply packet that includes the information identifying switch E itself, the information indicating the request packet receiving port, and the information on ports linked up in switch E. At this time, the information supply section 23 defines, in each reply packet, #1 and #2 as the information relating to the ports linked up in switch E. In the present example, the information supply section 23 defines {1, 1} as the output port list in the reply packet corresponding to the request packet transferred from port #3@D. The specific packet transmitting/receiving section 21 of switch E transmits the reply packet from port #1, then switch D transmits this reply packet from port #1, and the reply packet reaches control unit A (see FIGS. 12 and 14). This reply packet is shown as "reply(src:#1@E,ports:#1,#2)" in FIG. 14. Likewise, switch E defines {2, 2} as the output port list in the reply packet corresponding to the request packet transferred from port #1@B. Switch E transmits the reply packet from port #2, then switch B transmits this reply packet from port #2, and the reply packet reaches control unit A (see FIGS. 12 and 14). This reply packet is shown as "reply(src:#2@E,ports:#1,#2)" in FIG. 14.

The specific packet transmitting/receiving section 11 of control unit A uses port #1@A to receive the reply packet that has been transmitted from port #1@C. The topology searching section 12 of control unit A determines that port #1@C is connected to undetected connection destination port #2@D that was selected prior to the transmission of the request packet, and adds this information to the topology information. Similarly, control unit A uses port #2@A to receive the reply packet that has been transmitted from port #2@C. Control unit A determines that port #2@C is connected to undetected connection destination port #3@B that was selected prior to the transmission of the request packet, and adds this information to the topology information.

The specific packet transmitting/receiving section 11 of control unit A also uses port #1@A to receive the reply packet that has been transmitted from port #1@E. The topology searching section 12 of control unit A determines that port #1@E is connected to undetected connection destination port #3@D that was selected prior to the transmission of the request packet, and adds this information to the topology information. Similarly, control unit A uses port #2@A to receive the reply packet that has been transmitted from port #2@E. Control unit A determines that port #2@E is connected to undetected connection destination port #1@B that was selected prior to the transmission of the request packet, and adds this information to the topology information.

All undetected connection destination ports consequently disappear from the topology information, and thus the topology searching section 12 of control unit A determines that the topology information has been completed. The control channel path determining section 14 of control unit A sets independent control channels for each switch. For example, the control channel path determining section 14 uses Dijkstra's algorithm to calculate the shortest path to a switch, and sets the path as the control channel for the switch (see FIG. 13). Additionally, the control channel path determining section 14 of control unit A generates setup packets for each switch B to E, and the specific packet transmitting/receiving section 11 transmits the setup packets addressed to switches B to E. The path storing section 24 of each switch B to E, upon receiving the setup packets, stores the paths to control unit A as the control channels on the basis of the setup packets. Although the control channels that control unit A set for switches C, E are shown in the form of links of a thick line by way of example in FIG. 13, these control channels are not limited to those shown in FIG. 13.

Control channel A and switches B to E subsequently exchange control messages by tunneling via the control channels.

An example of a data structure of the topology information generated during the above operation is described below. The topology information describes which port of which switch is connected to which port of which switch. The topology searching section 12 generates the topology information using a data structure in which the ports of switches that are interconnected are clearly indicated as a pair, such as (#1@A, #1@D). Undetected connection destination ports may be specified in combination with the data meaning an "unknown port" (this data is referred to as "?" in the present example). A combination of (#3@D, ?), for example, may be used to denote that port #3@D is an undetected connection destination port. Alternatively, undetected connection destination ports may be specified using a data structure in which the undetected connection destination ports are not paired or combined and only the information indicating these undetected connection destination ports is included. Hereinafter, the data structure where undetected connection destination ports are specified in combination with "?" is referred to as the first data structure. The data structure where undetected connection destination ports are not paired or combined and only the information indicating these undetected connection destination ports is included is referred to as the second data structure. Topology information may be defined in either the first data structure or the second data structure, or in a data structure of any other descriptive format.

The following describes process steps in which topology information is generated as a result of the request packet and reply packet exchanges shown in FIG. 14. Defining topology information in the first data structure and defining topology information in the second data structure are both described in each example below.

Figure 15:
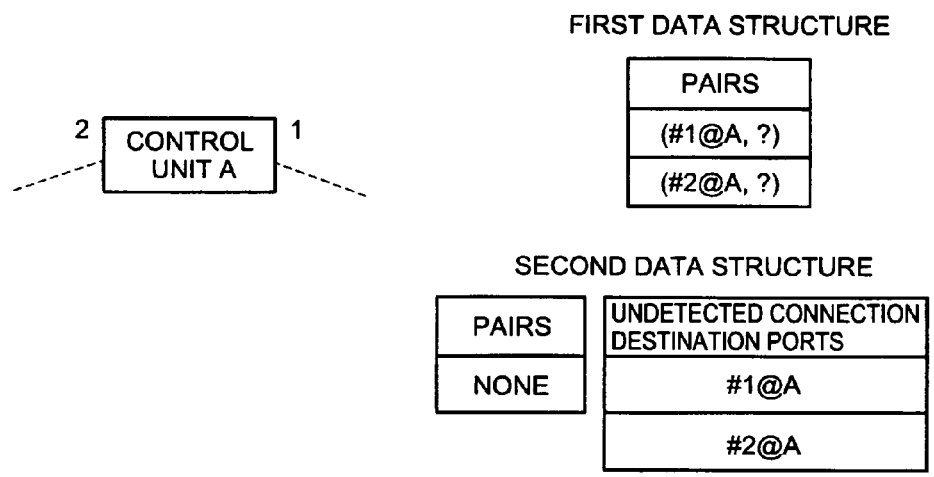
FIG. 15 depicts an explanatory diagram showing an example of a process step in which to generate topology information.

FIG. 15 shows an example of the topology information created under the initial state of the communication system. In definition with the first data structure, the topology information under the initial state is expressed as a pair of ports (#1@A, ?), (#2@A, ?). In definition with the second data structure, a pair or combination of ports is absent and ports #1@A, #2@A are expressed as undetected connection destination ports.

Figure 16:
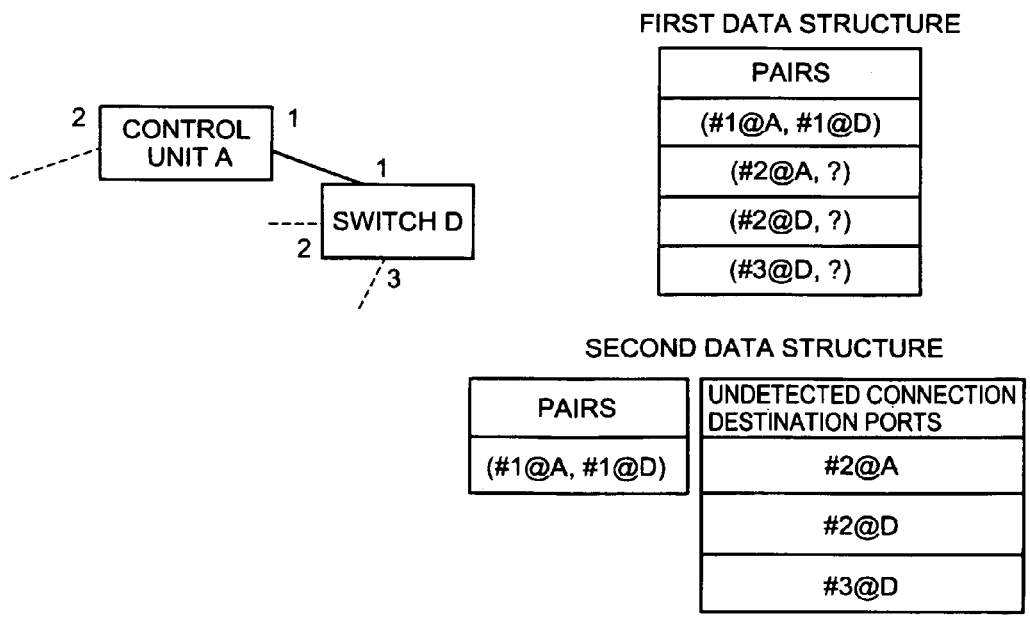
FIG. 16 depicts another explanatory diagram showing an example of a process step in which to generate topology information.

FIG. 16 shows an example of the topology information created by control unit A upon receiving a reply packet transmitted from port #1@D. Based on this reply packet, information is added that ports #1@A and #1@D are connected. In addition, ports #2@D, #3@D are added as undetected connection destination ports.

Figure 17:
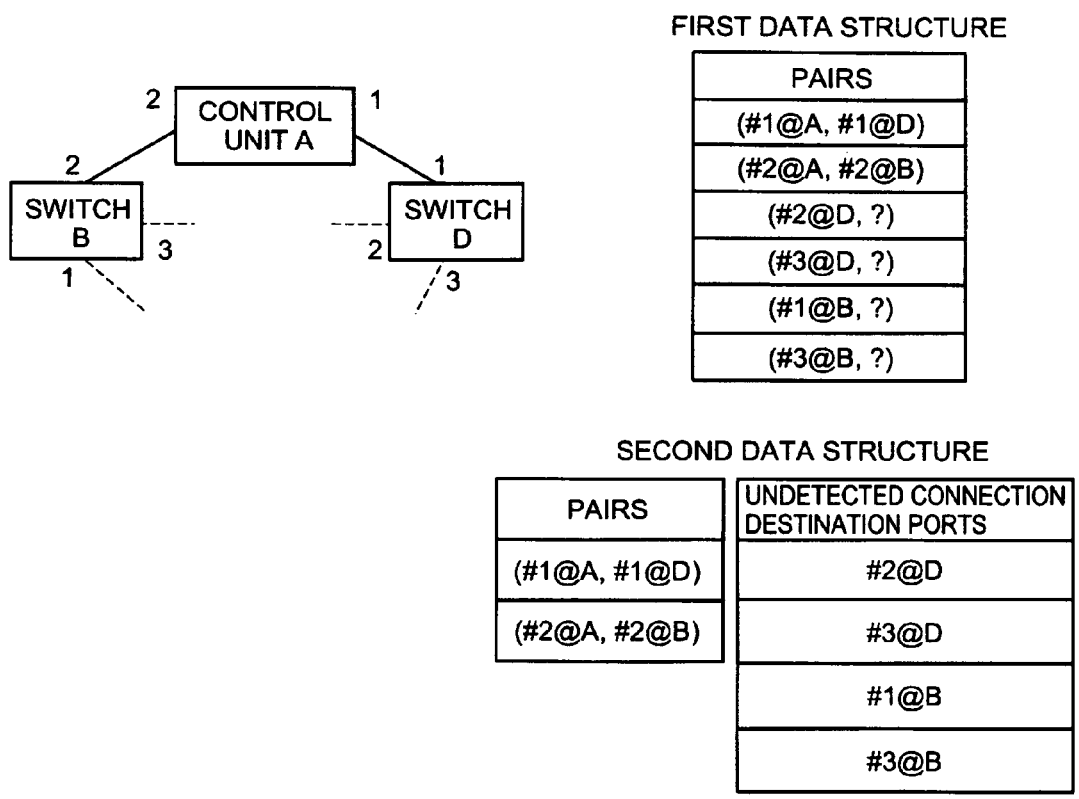
FIG. 17 depicts yet another explanatory diagram showing an example of a process step in which to generate topology information.

FIG. 17 shows an example of the topology information created by control unit A upon receiving a reply packet transmitted from port #2@B. Based on this reply packet, information is added that ports #2@A and #2@B are connected. In addition, ports #1@B, #3@B are added as undetected connection destination ports.

Figure 18:
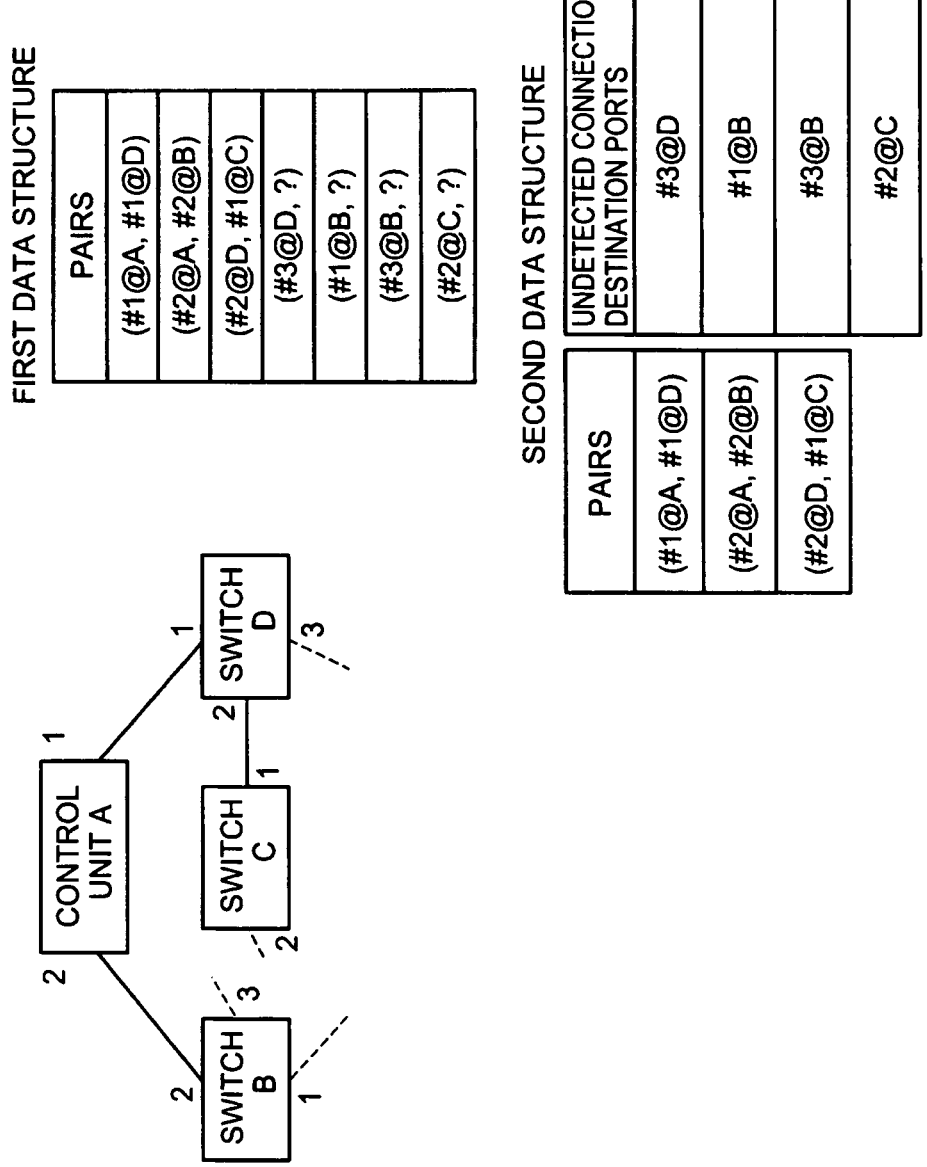
FIG. 18 depicts a further explanatory diagram showing an example of a process step in which to generate topology information.

FIG. 18 shows an example of the topology information created by control unit A upon receiving a reply packet transmitted from port #1@C. Based on this reply packet, information is added that ports #2@D and #1@C are connected. In addition, port #2@C is added as an undetected connection destination port.

Figure 19:
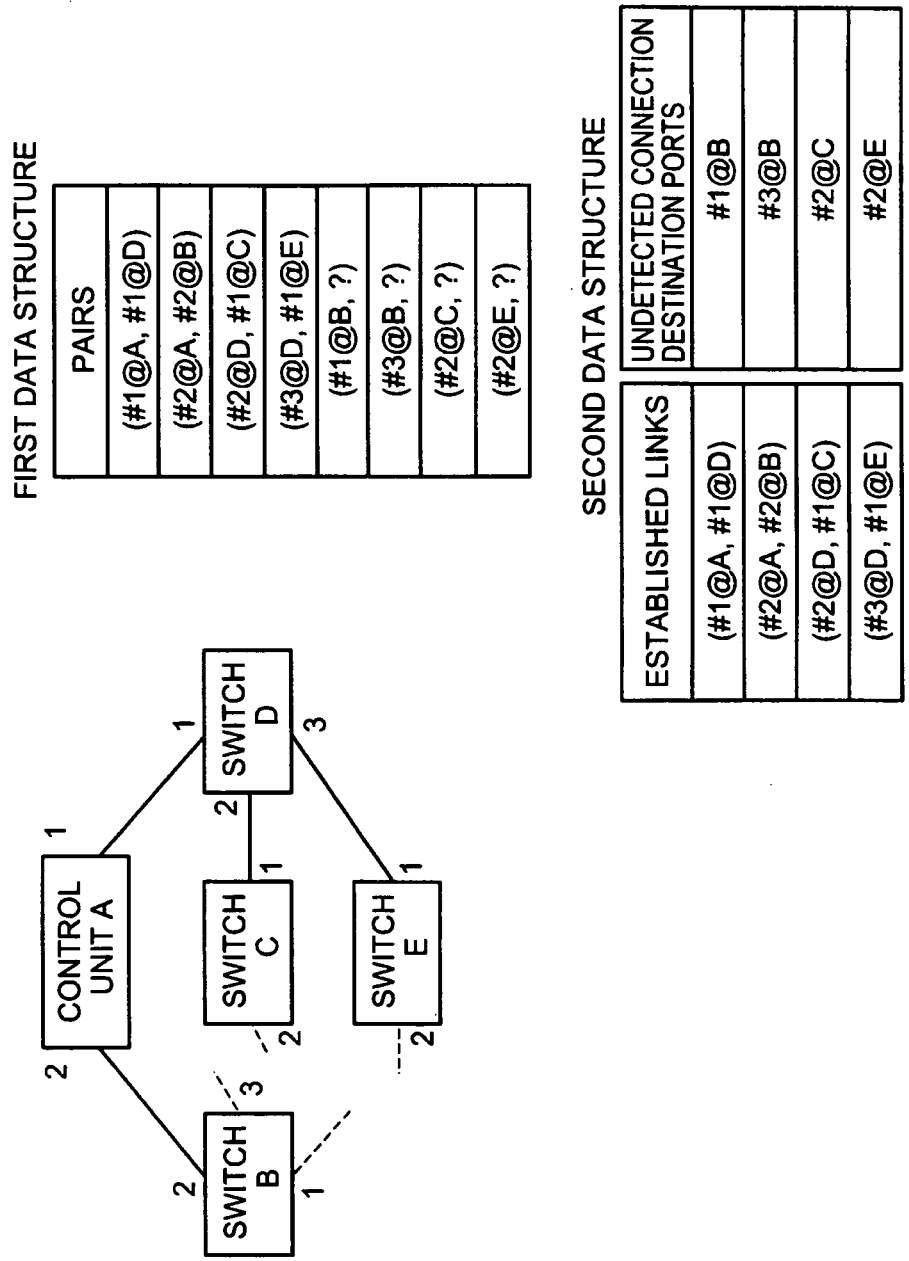
FIG. 19 depicts a further explanatory diagram showing an example of a process step in which to generate topology information.

FIG. 19 shows an example of the topology information created by control unit A upon receiving a reply packet transmitted from port #1@E. Based on this reply packet, information is added that ports #3@D and #1@E are connected. In addition, #2@E is added as an undetected connection destination port.

Figure 20:
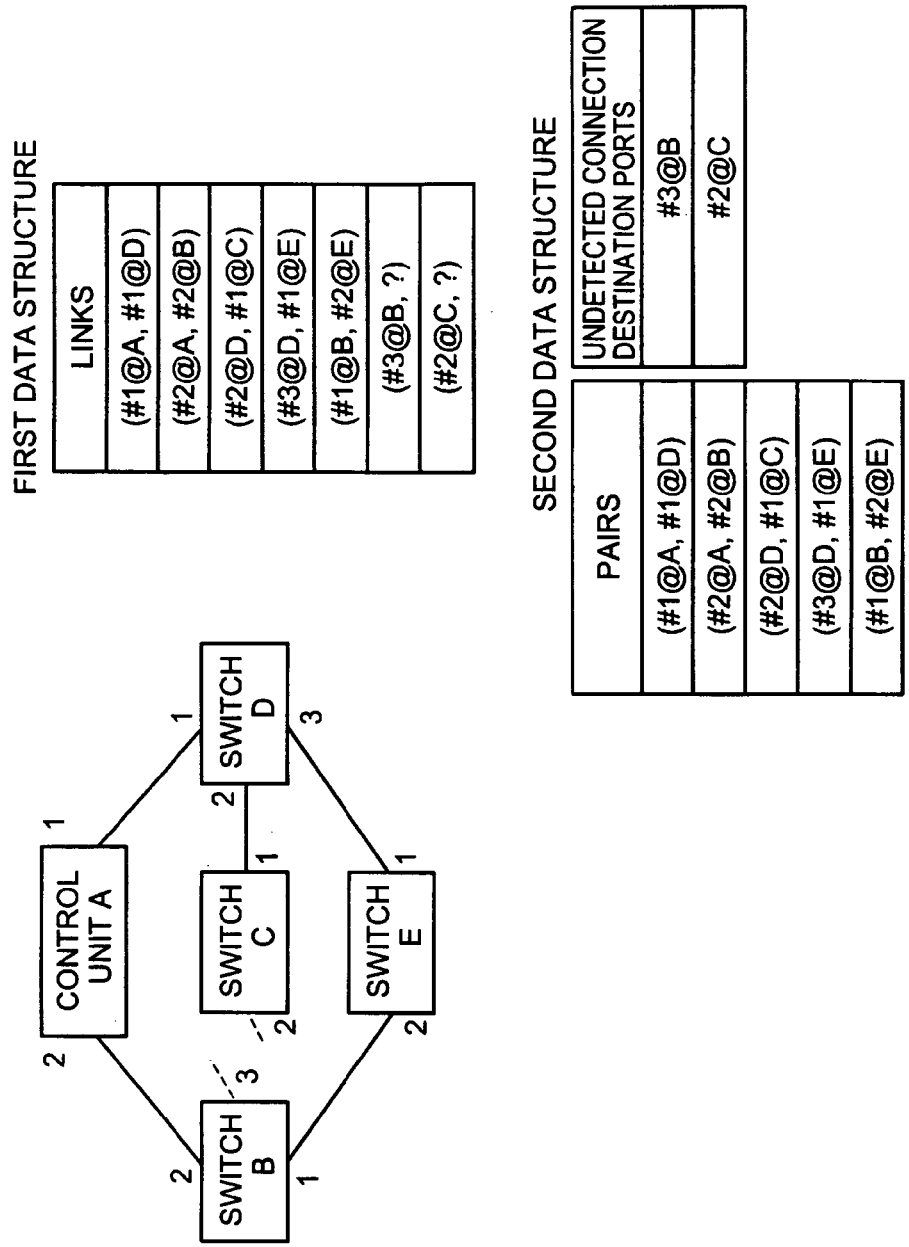
FIG. 20 depicts a further explanatory diagram showing an example of a process step in which to generate topology information.

FIG. 20 shows an example of the topology information created by control unit A upon receiving a reply packet transmitted from port #2@E. Based on this reply packet, information is added that ports #1@B and #2@E are connected.

Figure 21:
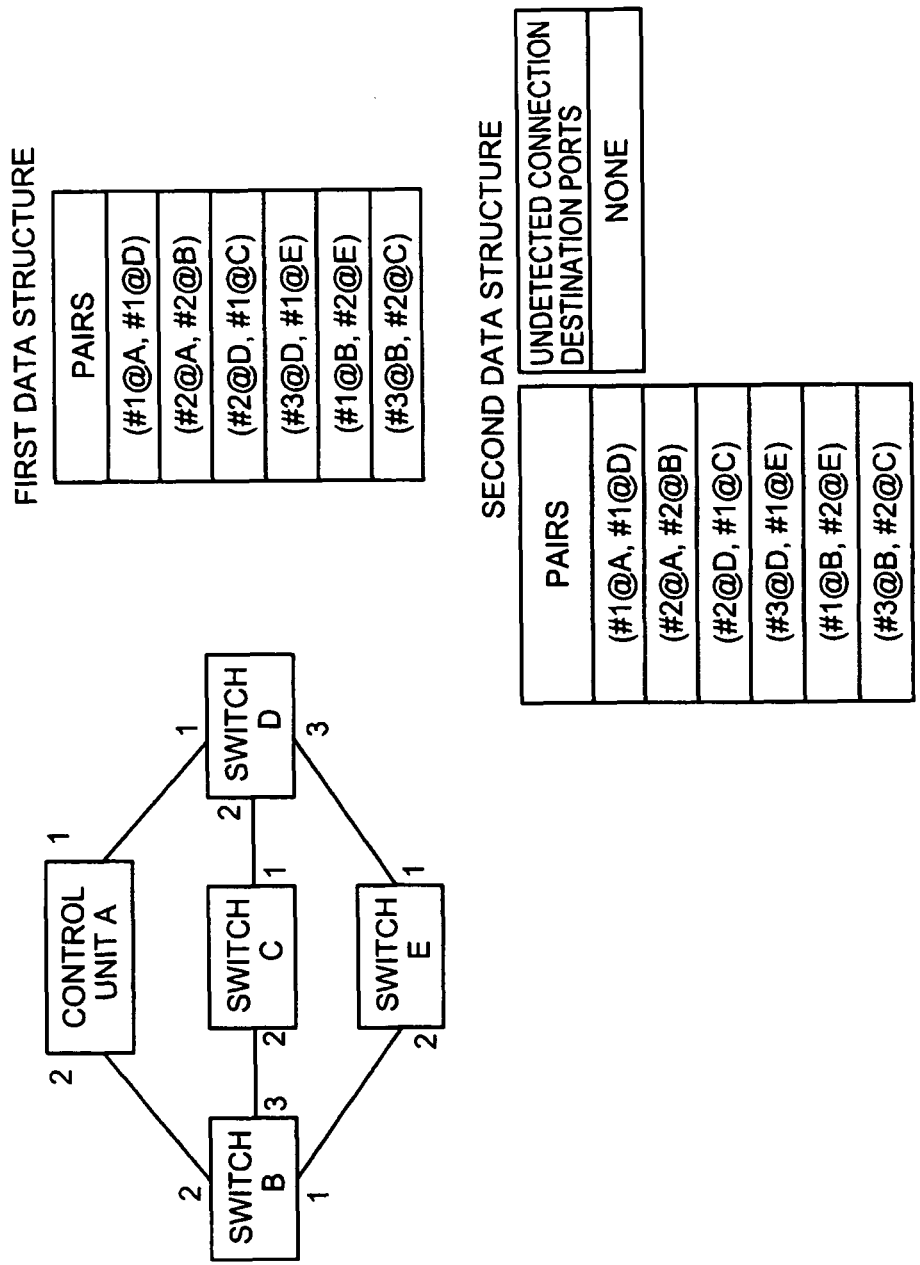
FIG. 21 depicts a further explanatory diagram showing an example of a process step in which to generate topology information.

FIG. 21 shows an example of the topology information created by control unit A upon receiving a reply packet transmitted from port #2@C. Based on this reply packet, information is added that ports #3@B and #2@C are connected. No undetected connection destination ports exist after the addition.

The communication system periodically creates appropriate topology information for a latest topology of switches by re-generating topology information from the start, and sets the control channels based on the new topology information. For example, the topology searching section 12 of control unit A periodically deletes the topology information stored within the topology storing section 13. The deletion returns the process to its initial state. After this, the topology searching section 12 restarts the process from generating a request packet. As a result, even if the creation of topology information is followed by a change in the topology of the switches, the control channels can be set by re-creating the topology information incorporating the new switch topology, or by incorporating the new switch topology.

Operation of the control unit and switches is detailed below referring to FIGS. 2, 22, and 23.

Figure 22:
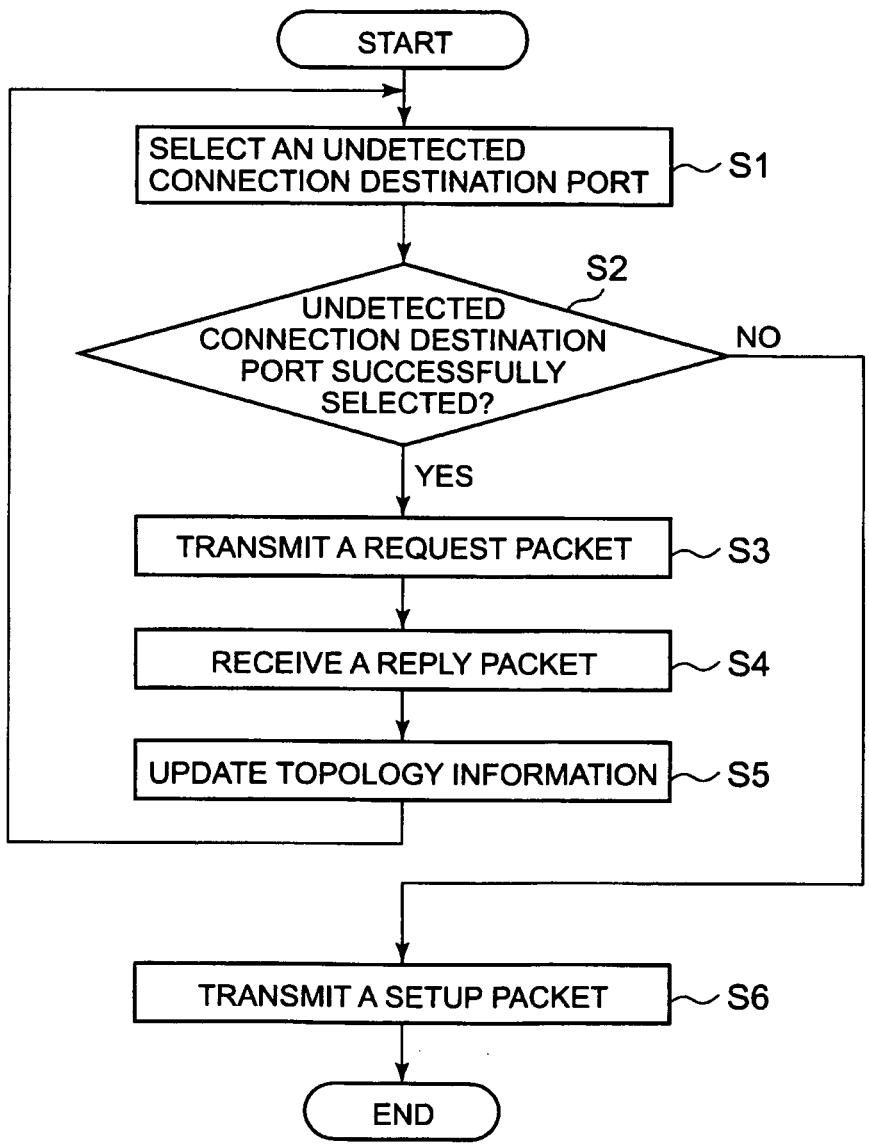
FIG. 22 depicts a flowchart showing an example of a process flow in the control unit.

FIG. 22 is a flowchart showing an example of a process flow in the control unit 10. This flowchart assumes that the control unit 10 is in its initial state, or that no topology information is stored in the control unit. The topology searching section 12 of the control unit 10 selects an undetected connection destination port (step S1). The topology searching section 12 initially selects the port of the control unit 10 that is linked up. If there is topology information stored within the topology storing section 13, the topology searching section 12 refers to the topology information and selects, of all ports of each switch that are linked up, only a port unknown about to which port of which switch the port is connected.

The topology searching section 12 determines whether the selection of an undetected connection destination port in step S1 was successful (step S2). If the selection of an undetected connection destination port was successful (determination results in step S2 were "Yes"), the topology searching section 12 generates a request packet transmitted from the undetected connection destination port, and makes the specific packet transmitting/receiving section 11 transmit the packet (step S3). If a plurality of undetected connection destination ports were selected in step S1, the topology searching section 12 generates a request packet for each undetected connection destination port. If the undetected connection destination port is that of the control unit 10, the topology searching section 12 defines the port identification number of that port as an output port list in the request packet, and then defines 1 as length of the output port list. In addition, the control unit 10 repeats a loop process of steps S1 to S5, to determine inter-port connection relationships in order from the switch(es) with the smallest number of hops from the control unit 10, the determination being conducted with a port of the control unit 10 as its starting point. If the undetected connection destination port is that of a switch, therefore, the topology searching section 12 can identify the output ports of each switch on the path from a port of the control unit 10 to the undetected connection destination port. Therefore, the topology searching section 12 defines, sequentially in the output port list, the port identification numbers of these output ports from the particular port of the control unit 10 to the undetected connection destination port. The topology searching section 12 also defines the number of output ports as length of the output port list, in the request packet. Additionally, the topology searching section 12 defines an initial port count value of 0 in all request packets. The specific packet transmitting/receiving section 11 transmits each request packet from the first port defined in the output port list of the request packet.

Each request packet, after being transmitted in step S3, reaches the switch connected to the last port defined in the output port list of the request packet, that is, the undetected connection destination port, and the switch transmits a reply packet addressed to the control unit 10, from the port where the switch has received the request packet. The reply packet includes the information identifying the switch which has transmitted the reply packet, the information indicating the port that is linked up in the switch, and the information indicating the port through which the switch has received the request packet.

The specific packet transmitting/receiving section 11 of the control unit 10 receives the reply packet transmitted from the request packet destination switch (i.e., the switch connected to the undetected connection destination port), in step S4. The specific packet transmitting/receiving section 11, upon determining the received specific packet to be a reply packet, outputs the reply packet to the topology searching section 12.

The topology searching section 12 updates the topology information on the basis of the reply packet that has been input from the specific packet transmitting/receiving section 11 (step S5). That is, the topology searching section 12 adds to the topology information the new inter-port connection relationships that have been made clear from the input reply information, by storing these relationships into the topology storing section 13.

It is only necessary in step S5 that as described below, the topology searching section 12 identify the inter-port connection relationships on the basis of the input reply information. Since the port identification number of the undetected connection destination port is defined at the last position in the output port list of the request packet, this packet is sequentially transferred to each switch with a port of the control unit 10 as its starting point, and reaches the switch connected to the undetected connection destination port. The reply packet transmitted from this switch includes the information identifying the switch itself, the information indicating the port that is linked up in the switch, and the information indicating the port through which the switch has received the request packet. The topology searching section 12, therefore, views the reply packet transferred through the path opposite to the transmission path of the request packet. The topology searching section 12 also determines that the transmission source switch of the reply packet is connected to the undetected connection destination port defined at the last position in the output port list of the request packet, and that the particular switch is connected to the port through which the switch has received the request packet. This makes it clear to which port of which switch the undetected connection destination port is connected. The topology searching section 12 adds to the topology information the interconnection relationship between the undetected connection destination port and the port of the switch determined to be connected thereto. The topology searching section 12 further adds to the topology information the information relating to each linked-up port of the switch determined to be connected to the undetected connection destination port (i.e., the transmission source switch of the reply packet). Next time the operation in step S1 is conducted, the topology searching section 12 selects, of all linked-up ports of each switch determined to be connected to the undetected connection destination port, only a port unknown about to which port of which switch the port is connected, as an undetected connection destination port.

After step S5, the control unit 10 repeats process step S1 onward.

If no undetected connection destination ports are present in the topology information and the selection of an undetected connection destination port fails ("No" in step S2), this means that the topology information has been completed. In this case, the control channel path determining section 14 views the completed topology information stored within the topology storing section 13 and sets the control channel leading to each switch. A method of setting the channel is not limited. The control channel path determining section 14 may calculate the shortest path to each switch and then set the calculated shortest path as the control channel. The control channel path determining section 14 generates, for each switch, a setup packet in which an output port list that indicates the control channel leading to the switch is defined. The control channel path determining section 14 also defines an initial port count value of 0 in the setup packet. The control channel path determining section 14 additionally defines length of the output port list. The control channel path determining section 14 makes the specific packet transmitting/receiving section 11 transmit the switch-by-switch generated setup packets (step S6). At this time, the specific packet transmitting/receiving section 11 transmits each setup packet from the first port defined in the output port list of the setup packet.

The switch that has received the setup packet specifies the control channel to the control unit 10, based on the setup packet, and stores the channel. This enables the control unit 10 and each switch to recognize the control channel. When the control unit 10 transmits a control message, the control message tunneling section 15 generates a tunnel packet by encoding and encapsulating the control message. At this time, the control message tunneling section 15 defines the output port list representing the control channel, length of the output port list, and an initial port count value of 0, in the tunnel packet. After this, the control message tunneling section 15 makes the specific packet transmitting/receiving section 11 transmit the tunnel packet. The specific packet transmitting/receiving section 11 transmits the tunnel packet from the first port defined in the output port list of the tunnel packet. In a case that the switch transmits the control message, the control message tunneling section 25 and the specific packet transmitting/receiving section 21 operate similarly to the above.

In addition, upon being determined to have received the tunnel packet from the switch, the specific packet transmitting/receiving section 11 of the control unit 10 outputs the tunnel packet to the control message tunneling section 15. The control message tunneling section 15 decapsulates the control message and decodes the decapsulated control message. The control unit 10 executes an appropriate process as a function of the decoded control message.

The topology searching section 12 periodically deletes the topology information stored within the topology storing section 13. The deletion returns the process to its initial state. After this, process step S1 onward is restarted from the initial state. As a result, the control unit 10 periodically generates topology information once again. After the creation of topology information, therefore, even if the topology of switches is changed, the control unit 10 can incorporate the new topology into the new topology information created. The control unit 10 can also set a control channel incorporating the new topology.

Figure 23:
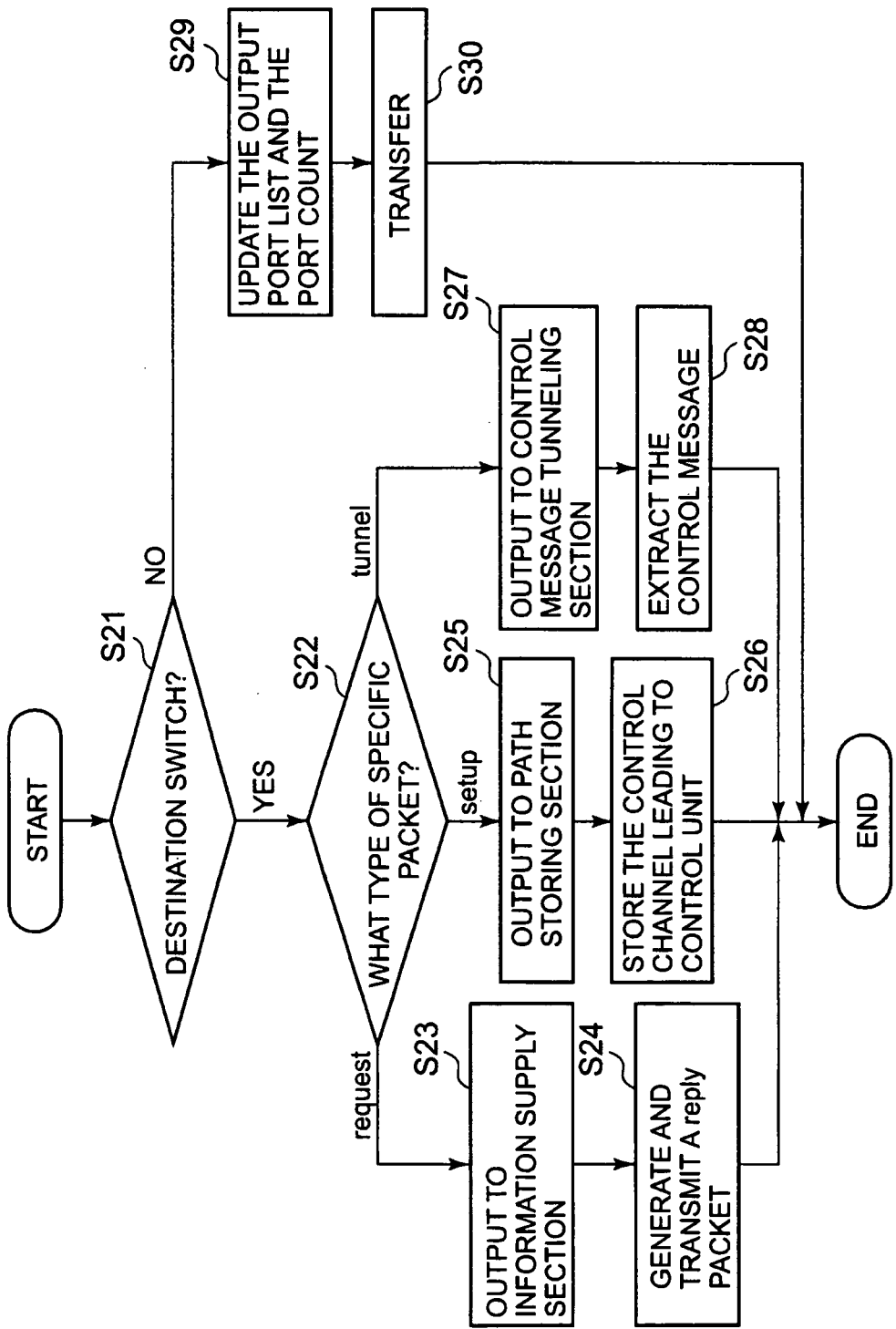
FIG. 23 depicts a flowchart showing an example of a process flow in the switch.

FIG. 23 is a flowchart showing an example of a process flow in the switch. Upon the switch receiving a specific packet, the specific packet transmitting/receiving section 21 determines whether the switch itself that has received the specific packet is the destination thereof (step S21). If the switch itself is the destination ("Yes" in step S21), the specific packet transmitting/receiving section 21 discriminates the type of specific packet (step S22).

If the specific packet is a request packet, the specific packet transmitting/receiving section 21 outputs the request packet to the information supply section 23 (step S23). The information supply section 23 then generates a reply packet that includes the information relating to ports of the switch itself that are linked up, the information identifying the switch, and the identification number of the port through which the request packet has been received. The information supply section 23 also updates the last port identification number defined in the output port list of the received request packet, into the port identification number of the port through which the request packet has been received. Additionally, the port identification numbers in the output port list are rearranged in reverse order. The information supply section 23 defines this rearranged output port list in the reply packet. The information supply section 23 further defines length of the output port list and the initial value of the port count, in the reply packet, and makes the specific packet transmitting/receiving section 21 transmit the reply packet (step S24). In step S24, the specific packet transmitting/receiving section 21 transmits the reply packet from the port denoted by the first port identification number written in the output port list. As a result, the reply packet is transferred in a reverse direction through the transfer path of the request packet and reaches the control unit 10.

If the specific packet is a setup packet, the specific packet transmitting/receiving section 21 outputs the setup packet to the path storing section 24 (step S25). The path storing section 24 updates the last port identification number defined in the output port list of the setup packet, into the port identification number of the port through which the setup packet has been received. The path storing section 24 also rearranges the port identification numbers of the output port list in reverse order and stores the rearranged output port list as the information indicating the path which becomes a control channel (step S26).

If the specific packet is a request packet, the specific packet transmitting/receiving section 21 outputs the tunnel packet to the control message tunneling section 25 (step S27). The control message tunneling section 25 decapsulates the control message included in the tunnel packet and decodes the decapsulated control message (step S33). The switch executes an appropriate process as a function of the decoded control message.

If the switch itself that has received the specific packet is not the destination thereof ("No" in step S21), the specific packet transmitting/receiving section 21 replaces, of all port identification numbers in the output port list, only the port identification number at the position determined by the port count, with the port identification number of the port through which the specific packet has been received. The specific packet transmitting/receiving section 21 also adds 1 to the port count in the specific packet (step S29). Additionally, the specific packet transmitting/receiving section 21 transmits the specific packet (step S30).

The specific-packet receiving process is completed upon the execution of either step S24, S26, S28, or S30.

According to the present invention, the control channel between the control unit and switches is set via the communications network over which each switch transfers a data packet. In other words, the communications network over which the switch transfers the data packet, and the control channel are realized with one kind of communications network. This also yields additional advantageous effects, which are described below.

First, redundancy and fault-tolerance improve. This is because, even in the case of a failure occurring in part of the communications network over which the switch transfers the data packet, the control channel can be set if the path from the control unit 10 to the switch is ensured. For example, in the topology shown in FIG. 2, even if a link fault between the control unit 10 and the switch 20b clears the linked-up state established between both, the control unit 10 transmits a request packet from the switch 20a to the switches 20a to 20d in order. This establishes the control channel between the control unit 10 and each switch.

Figure 27:
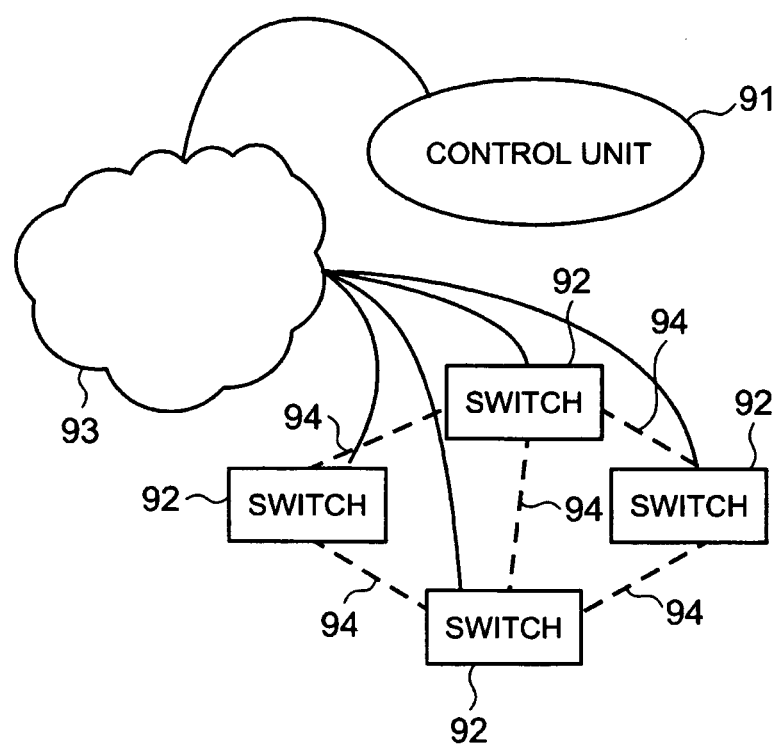
FIG. 27 depicts an explanatory diagram showing an example of a general communication system to which Open-Flow is applied.

Comparisons against the general communication system shown by way of example in FIG. 27 are discussed below. As shown in FIG. 27, in a configuration with the control communications network 93 provided independently of the packet transfer communications network 94, even if paths exist that enable a packet to reach the switches 92 from the control unit 91 physically, these paths are not used for control. Accordingly, a failure in the control communications network 93 has caused a control failure in the control unit 91, thus reducing fault-tolerance. According to the present invention, in contrast, redundancy and fault-tolerance improve for the foregoing reasons.

Secondly, because of no need to provide a special communications network for the control channel, there is no need to manage such a special communications network, and thus the communication system can be reduced in management costs. If the number of switches is increased or reduced, the control unit 10 also periodically deletes the topology information and returns the process to the initial state. In addition, a restart of the process from step S1 (see FIG. 22) enables creation of the latest topology information at a particular point of time, and hence, setting of the control channel leading to each switch.

Comparisons against the general communication system shown by way of example in FIG. 27 are discussed below. In the communication system shown by way of example in FIG. 27, management costs increase since the control communications network 93 and the packet transfer communications network 94 both need managing. For example, if the topology of the switch group is changed by adding switches, necessity arises to add a link to both of the control communications network 93 and the packet transfer communications network 94, in order to suit the change. In the present invention, however, the use of the foregoing sequence reduces the costs required for the management of the communication system.

Thirdly, even after the number of switches has been increased, the control unit 10 can create the latest topology information by transmitting a request packet, as described above. At this time, since only the control unit 10 is the transmission source of the request packet, traffic associated with specific-packet exchanges under the increase in the number of switches can be suppressed to a lower level than in cases such as adopting BPDU in STP. This advantage, in turn, makes it possible to prevent the communication system from spending too much time before starting the creation of topology information, and from heavily loading the communications line.

Comparisons against the general communication system shown by way of example in FIG. 27 are discussed below. In the general communication system shown by way of example in FIG. 27, if the topology of switches is changed, since a control frame (e.g., BPDU in STP) that the communication system is to use to recognize the new topology is exchanged among the switches, using too many switches will lead to frequent generation of such a control frame and result in a great deal of time being required for improvement of this state, or in the communications line being heavily loaded. In the present invention, however, since the traffic associated with the specific-packet exchanges under the increase in the number of switches can, as described above, be suppressed to a lower level than in cases such as adopting BPDU in STP, scalability can be achieved with regard to a scale of the communication system.

Figure 24:
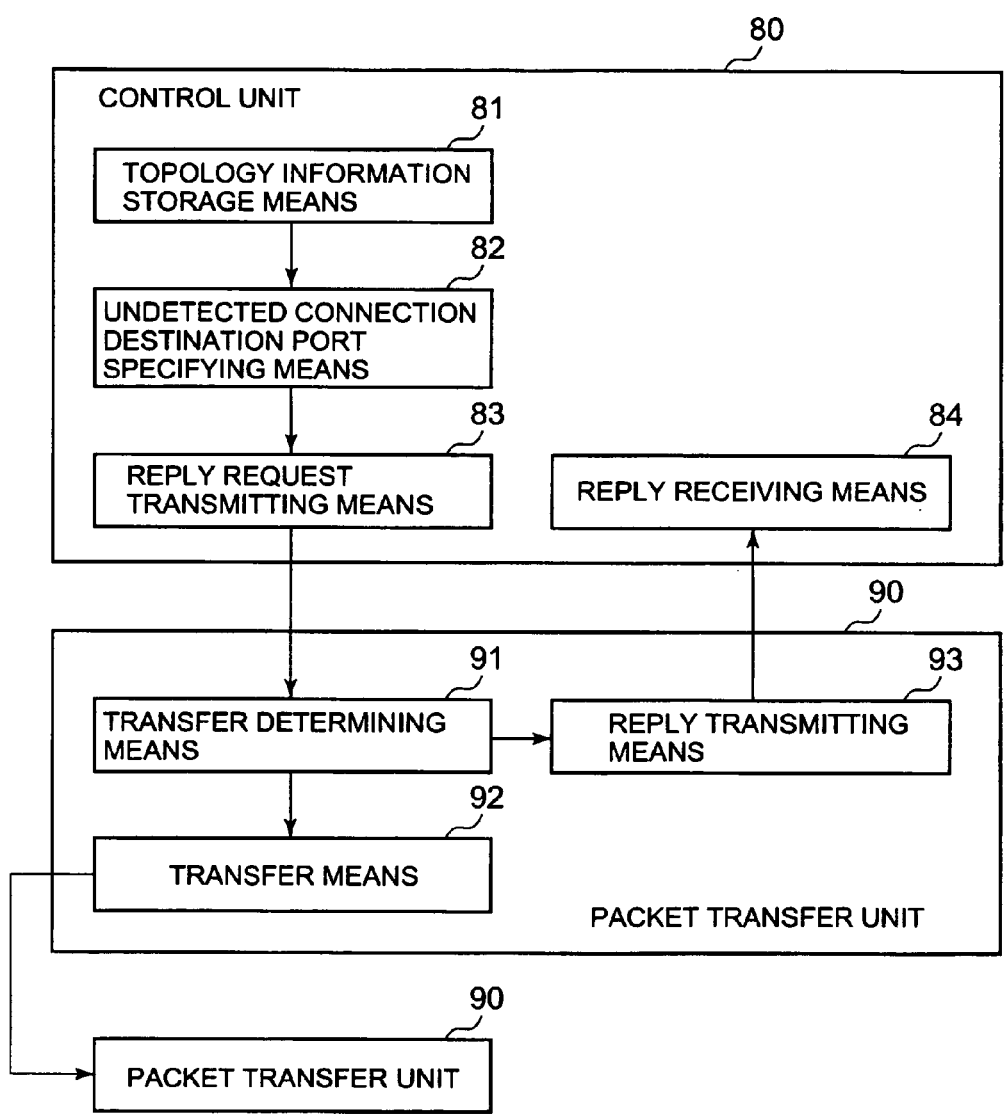
FIG. 24 depicts a block diagram showing an example of a minimum configuration of the communication system according to the present invention.
Figure 25:
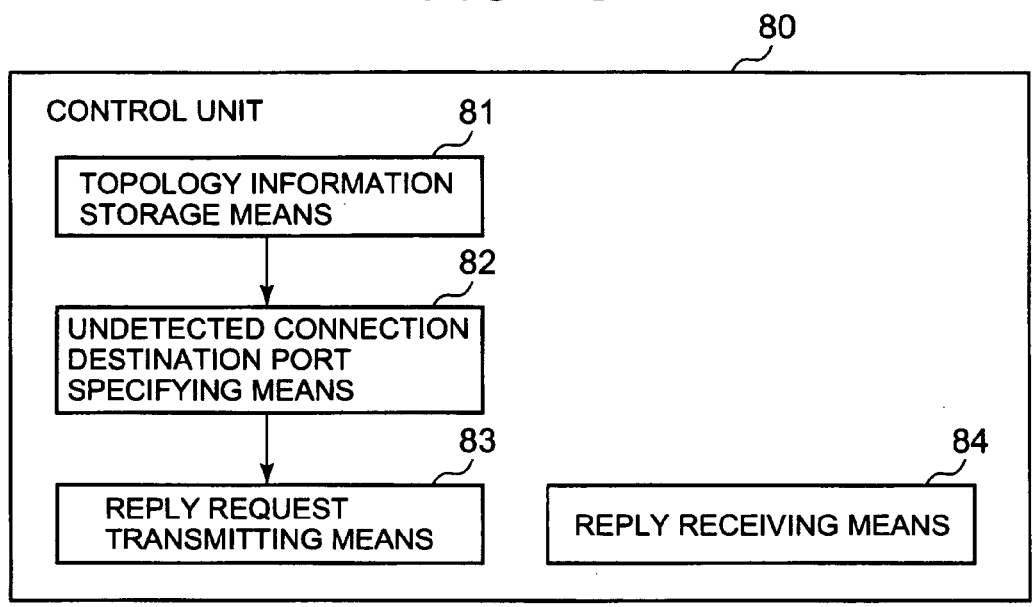
FIG. 25 depicts a block diagram showing an example of a minimum control unit configuration in the present invention.
Figure 26:
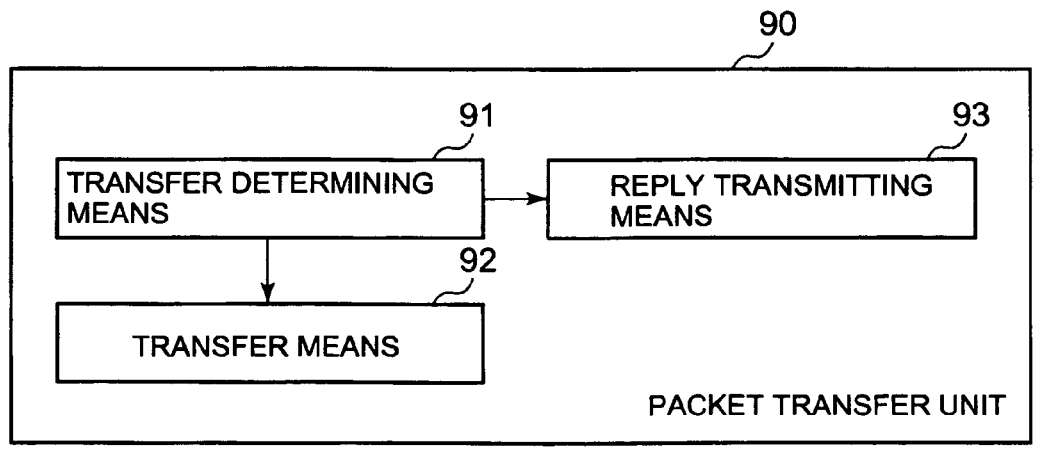
FIG. 26 depicts a block diagram showing an example of a minimum packet transfer unit configuration in the present invention.

Next, examples of minimum configurations of the present invention are described below. FIG. 24 is a block diagram showing an example of a minimum configuration of the communication system according to the present invention. FIG. 25 is a block diagram showing an example of a minimum control unit configuration in the present invention. FIG. 26 is a block diagram showing an example of a minimum packet transfer unit configuration in the present invention.

The communication system according to the present invention includes a plurality of packet transfer devices 90 (e.g., the switches 20a to 20d) and a control unit 80 (e.g., control unit 10) that controls each packet transfer unit 90.

The control unit 80 includes topology information storage means 81, undetected connection destination port specifying means 82, reply request transmitting means 83, and reply request receiving means 84 (see FIGS. 24 and 25).

The topology information storage means 81 (e.g., the topology storing section 13) stores the topology information that includes interconnection information on ports of the control unit 80 or the packet transfer unit 90.

The undetected connection destination port specifying means 82 (e.g., the part that executes step S1 in the topology searching section 12) specifies, from the topology information, only an undetected connection destination port of all ports of the control unit 80 or packet transfer unit 90, the undetected connection destination port being a port whose connection destination has not been successfully detected during its connection destination search.

The reply request transmitting means 83 (e.g., the topology searching section 12 and/or the control unit-side specific packet transmitting/receiving section 11) sends a reply request (e.g., a request packet) to a connection destination of the undetected connection destination port, via the undetected connection destination port.

The reply receiving means 84 (e.g., the control unit-side specific packet transmitting/receiving section 11) receives, from a packet transfer unit which becomes a connection destination of the undetected connection destination port, a reply (e.g., reply packet) that includes information on ports of the packet transfer unit.

The packet transfer unit 90 includes transfer determining means 91, transfer means 92, and reply transmitting means 93.

The transfer determining means 91 (e.g., the part for executing step S21 in the switch-side specific packet transmitting/receiving section 21) determines whether the received reply request is to be transferred to another packet transfer unit in accordance with a content of the reply request.

The transfer means 92 (e.g., the part for executing step S30 in the switch-side specific packet transmitting/receiving section 21), upon the reply request being determined to be transferred to any other packet transfer unit, transfers the reply request thereto in accordance with the content of the reply request.

The reply transmitting means 93 (e.g., the switch-side specific packet transmitting/receiving section 21 and/or the information supply section 23), upon the reply request being determined not to be transferred to any other packet transfer unit, returns a reply that includes information on ports of the local packet transfer unit, the reply being sent along the path leading to the control unit.

The above exemplary embodiment includes those characteristic communication system configurations that are described in items (1) to (10) below. Those characteristic control unit configurations that are described in items (11) to (13) that follow are also included. Those characteristic packet transfer unit configurations that are described in items (14) and (15) that follow are additionally included.

(1) The communication system of the present invention includes a plurality of packet transfer devices (e.g., the switches 20a to 20d) and a control unit (e.g., control unit 10) that controls each packet transfer unit, wherein: the control unit includes topology information storage means (e.g., topology storing section 13) that stores topology information which includes interconnection information on ports of the control unit or each packet transfer unit, undetected connection destination port specifying means (e.g., the part for executing step S1 in the topology searching section 12) that specifies, from the topology information, only an undetected connection destination port of all ports of the control unit or each packet transfer unit, the undetected connection destination port being a port whose connection destination is undetected, reply request transmitting means (e.g., the topology searching section 12 and/or control unit-side specific packet transmitting/receiving section 11) that transmits a reply request (e.g., a request packet) to a connection destination of the undetected connection destination port, via the undetected connection destination port, and reply receiving means (e.g., the control unit-side specific packet transmitting/receiving section 11) that receives, from a packet transfer unit which becomes a connection destination of the undetected connection destination port, a reply that includes information on the ports of the packet transfer unit; and the packet transfer unit includes transfer determining means (e.g., the part for executing step S21 in the switch-side specific packet transmitting/receiving section 21) that determines whether the received reply request is to be transferred to another packet transfer unit in accordance with a content of the reply request, transfer means (e.g., the part for executing step S30 in the switch-side specific packet transmitting/receiving section 21) that upon the reply request being determined to be transferred to any other packet transfer unit, transfers the reply request to any other packet transfer unit in accordance with the content of the reply request, and reply transmitting means (e.g., the switch-side specific packet transmitting/receiving section 21 and/or information supply section 23) that upon the reply request being determined not to be transferred to any other packet transfer unit, returns the reply that includes information on the ports of the local packet transfer unit, the reply being sent along a path leading to the control unit.

(2) In addition, for example, the control unit further includes topology information adding means (e.g., the part for executing step S5 in the topology searching section 12) that adds, to the topology information, information that relates to the ports of the packet transfer unit which becomes the connection destination of the undetected connection destination port and is included in the reply received from the packet transfer unit, and if one of the ports of the packet transfer unit is a port whose connection destination is undetected, the port being other than that through which the packet transfer unit has received the reply request, the topology information adding means further adds, to the topology information, information indicating that the port is undetected.

(3) Furthermore, for example, the reply request transmitting means stops the transmission of the reply request if the undetected connection destination port specifying means determines an undetected connection destination port to be absent.

(4) Moreover, for example, the reply request transmitting means defines, as a reply request transfer path in a reply request, a list that is a sequential array of information on ports from which each packet transfer unit on a path extending from a port of the control unit to the undetected connection destination port is to output the reply request, the transfer means transfers the reply request along the transfer path defined in the reply request, and the reply transmitting means discriminates a reply transmitting path to the control unit, based on the transfer path defined in the reply request.

(5) Besides, for example, the control unit includes control channel determining means (e.g., the control channel path determining section 14) that uses the topology information to set a control channel which is the path between the control unit and each packet transfer unit, and control channel notice transmitting means (e.g., the control unit-side specific packet transmitting/receiving section 11) that transmits a control channel notice to notify each packet transfer unit of the control channel, and the packet transfer unit includes control channel storage means (e.g., the path storing section 24) that upon receiving the control channel notice, uses it to store the control channel interconnecting the control unit and the local packet transfer unit.

(6) The communication system of the present invention may include a plurality of packet transfer devices and a control unit that controls each packet transfer unit, wherein: the control unit includes a topology information storage section that stores topology information which includes interconnection information on ports of the control unit or each packet transfer unit, an undetected connection destination port specifying section that specifies, from the topology information, only an undetected connection destination port of all ports of the control unit or packet transfer unit, the undetected connection destination port being a port whose connection destination is undetected, a reply request transmitting section that transmits a reply request to a connection destination of the undetected connection destination port via the undetected connection destination port, and a reply receiving section that receives, from a packet transfer unit which becomes a connection destination of the undetected connection destination port, a reply that includes information on the ports of the packet transfer unit; and the packet transfer unit includes a transfer determining section that determines whether the received reply request is to be transferred to another packet transfer unit in accordance with a content of the reply request, a transfer section that upon the reply request being determined to be transferred to any other packet transfer unit, transfers the reply request to any other packet transfer unit in accordance with the content of the reply request, and a reply transmitting section that upon the reply request being determined not to be transferred to any other packet transfer unit, returns the reply that includes information on the ports of the local packet transfer unit, the reply being sent along the path leading to the control unit.

(7) In addition, for example, the control unit further includes a topology information adding section that adds, to the topology information, information that relates to the ports of the packet transfer unit which becomes the connection destination of the undetected connection destination port and is included in the reply received from the packet transfer unit, and if one of the ports of the packet transfer unit is a port whose connection destination is undetected, the port being other than that through which the packet transfer unit has received the reply request, the topology information adding section further adds, to the topology information, information indicating that the port is undetected.

(8) Furthermore, for example, the reply request transmitting section stops the transmission of the reply request if the undetected connection destination port specifying section determines an undetected connection destination port to be absent.

(9) Furthermore, for example, the reply request transmitting section defines, as the reply request transfer path, in the reply request, a list that is a sequential array of information on ports from which each packet transfer unit on a path extending from a port of the control unit to the undetected connection destination port is to output the reply request, the transfer section transfers the reply request along the transfer path defined in the reply request, and the reply transmitting section discriminates a reply transmitting path to the control unit on the basis of the transfer path defined in the reply request.

(10) Furthermore, for example, the control unit includes a control channel determining section that uses the topology information to set a control channel which is the path between the control unit and each packet transfer unit, and a control channel notice transmitting section that transmits a control channel notice to notify each packet transfer unit of the control channel, and the packet transfer unit includes a control channel storage section that upon receiving the control channel notice, uses it to store the control channel interconnecting the control unit and the local packet transfer unit.

(11) A control unit according to another aspect of the present invention controls a plurality of packet transfer devices, the control unit including: a topology information storage section that stores topology information which includes interconnection information on ports of the control unit or each of the packet transfer devices; an undetected connection destination port specifying section that specifies, from the topology information, only an undetected connection destination port of all ports of the control unit or each packet transfer unit, the undetected connection destination port being a port whose connection destination is undetected; a reply request transmitting section that transmits a reply request to a connection destination of the undetected connection destination port, via the undetected connection destination port; and a reply receiving section that receives, from a packet transfer unit which becomes the connection destination of the undetected connection destination port, a reply that includes information on the ports of the packet transfer unit.

(12) In addition, the control unit may further include a topology information adding section that adds, the topology information, information that relates to the ports of the packet transfer unit which becomes the connection destination of the undetected connection destination port and is included in the reply received from the packet transfer unit, and if one of the ports of the packet transfer unit is a port whose connection destination is undetected, the port being other than that through which the packet transfer unit has received the reply request, the topology information adding section further adds, to the topology information, information indicating that the port is undetected.

(13) Furthermore, the control unit of the present invention, configured to control a plurality of packet transfer devices, may include: topology information storage means that stores topology information that includes interconnection information on ports of the control unit or each packet transfer unit; undetected connection destination port specifying means that specifies, from the topology information, only an undetected connection destination port of all ports of the control unit or packet transfer unit, the undetected connection destination port being a port whose connection destination is undetected; reply request transmitting means that transmits a request reply request to a connection destination of the undetected connection destination port, via the undetected connection destination port; and reply receiving means that receives, from a packet transfer unit which becomes the connection destination of the undetected connection destination port, a reply that includes information on the ports of the packet transfer unit.

(14) A packet transfer unit according to yet another aspect of the present invention is controlled by a control unit, the packet transfer unit including: a transfer determining section that upon receiving from the control unit a reply request addressed to a connection destination of an undetected connection destination port whose connection destination is undetected, determines whether the reply request is to be transferred to another packet transfer unit in accordance with a content of the reply request; a transfer section that upon the reply request being determined to be transferred to any other packet transfer unit, transfers the reply request to any other packet transfer unit in accordance with the content of the reply request; and a reply transmitting section that upon the reply request being determined not to be transferred to any other packet transfer unit, returns a reply that includes information on ports of the local packet transfer unit, the reply being sent along a path leading to the control unit.

(15) Besides, the packet transfer unit of the present invention, controlled by a control unit, may include: transfer determining means that upon receiving from the control unit a reply request addressed to a connection destination of an undetected connection destination port whose connection destination is undetected, determines whether the reply request is to be transferred to another packet transfer unit in accordance with a content of the reply request; transfer means that upon the reply request being determined to be transferred to any other packet transfer unit, transfers the reply request to any other packet transfer unit in accordance with the content of the reply request; and reply transmitting means that upon the reply request being determined not to be transferred to any other packet transfer unit, returns a reply that includes information on ports of the local packet transfer unit, the reply being sent along the path leading to the control unit.

While the present invention has been described above referring to the exemplary embodiments, the invention is not limited to the exemplary embodiments. Various changes understandable to a person skilled in the art may be made to the configuration and details of the invention within the scope thereof.

This application claims priority based on Japanese Patent Application No. 2009-298852, filed on Dec. 28, 2009, the entire disclosure of which is hereby incorporated by reference into the application.

INDUSTRIAL APPLICABILITY

The present invention is suitably applied to a communication system that includes a plurality of packet transfer devices and a control unit that controls each packet transfer unit.

REFERENCE SIGNS LIST

10 Control unit
11 Control unit-side specific packet transmitting/receiving section
12 Topology searching section
13 Topology storing section
14 Control channel path determining section
15 Control unit-side control message tunneling section
20a to 20d, 20A to 20D Switches (Packet transfer devices)
21 Switch-side specific packet transmitting/receiving section
23 Information supply section
24 Path storing section
25 Switch-side control message tunneling section

The invention claimed is:

1. A communication system, comprising:
a plurality of packet transfer units; and
a control unit that controls each of the packet transfer units,
wherein the control unit includes:
topology information storing means that stores topology information which includes interconnection information on ports of the control unit or ports of each packet transfer unit;
undetected connection destination port specifying means that specifies, from the topology information, an undetected connection destination port of all ports of the control unit or each packet transfer unit, the undetected connection destination port comprising a port whose connection destination is undetected;
reply request transmitting means that transmits a reply request to a connection destination of the undetected connection destination port via the undetected connection destination port; and
reply receiving means that receives, from a packet transfer unit which becomes a connection destination of the undetected connection destination port, a reply that includes information on the ports of the packet transfer unit, and
the packet transfer unit includes:
transfer determining means that determines whether a received reply request is to be transferred to another packet transfer unit, as based on a content of the received reply request;
transfer means that transfers the received reply request to the another packet transfer unit, when it is determined that the reply request is to be transferred to any other packet transfer unit; and
reply transmitting means that returns a reply that includes information on ports of the packet transfer unit receiving the reply request when it is determined that the reply request is not to be transferred to any other packet transfer unit, the reply being sent along a path leading to the control unit.

2. The communication system according to claim 1, wherein the control unit further includes topology information adding means that adds, to the topology information, information that relates to the ports of the packet transfer unit which becomes the connection destination of the undetected connection destination port and is included in the reply received from the packet transfer unit, and if one of the ports of the packet transfer unit comprises a port whose connection destination is undetected, the port being other than that through which the packet transfer unit has received the reply request, the topology information adding means further adds, to the topology information, information indicating that the port is undetected.

3. The communication system according to claim 1, wherein:
the reply request transmitting means stops the transmission of the reply request if the undetected connection destination port specifying means determines an undetected connection destination port to be absent.

4. The communication system according to claim 1, wherein:
the reply request transmitting means defines, as a reply request transfer path in a reply request, a list comprising a sequential array of information on ports from which each packet transfer unit on a path extending from a port of the control unit to the undetected connection destination port is to output the reply request;

the transfer means transfers the reply request along the transfer path defined in the reply request; and the reply transmitting means discriminates a reply transmitting path to the control unit, based on the transfer path defined in the reply request.

5. The communication system according to claim 1, wherein:

the control unit includes control channel determining means that uses the topology information to set a control channel which comprises the path between the control unit and each packet transfer unit, and control channel notice transmitting means that transmits a control channel notice to notify each packet transfer unit of the control channel; and the packet transfer unit includes control channel storage means that, upon receiving the control channel notice, uses it to store the control channel interconnecting the control unit and the local packet transfer unit.

6. A packet transfer unit controlled by a control unit, the packet transfer unit comprising:

transfer determining means that upon receiving from the control unit a reply request addressed to a connection destination of an undetected connection destination port whose connection destination is undetected, determines whether the reply request is to be transferred to another packet transfer unit, based on a content of the reply request;

transfer means that transfers the reply request to the other packet transfer unit, when it is determined that the reply request is to be transferred to another packet transfer unit; and reply transmitting means that, when it is determined that the reply request is not to be transferred to another packet transfer unit, returns a reply that includes information on ports of the local packet transfer unit receiving the reply request, the reply being sent along a path leading to the control unit.

7. The communication system according to claim 1, wherein the topology information storing means comprises data structures tangibly embodied in a machine readable memory device.

8. The communication system according to claim 2, wherein the reply request transmitting means stops the transmission of the reply request if the undetected connection destination port specifying means determines an undetected connection destination port to be absent.

9. The communication system according to claim 2, wherein:

the reply request transmitting means defines, as a reply request transfer path in a reply request, a list comprising a sequential array of information on ports from which each packet transfer unit on a path extending from a path of the control unit to the undetected connection destination port is to output the reply request;

the transfer means transfers the reply request along the transfer path defined in the reply request; and the reply transmitting means discriminates a reply transmitting path to the control unit, based on the transfer path defined in the reply request.

10. The communication system according to claim 3, wherein:

the reply request transmitting means defines, as a reply request transfer path in a reply request, a list comprising a sequential array of information on ports from which each packet transfer unit on a path extending from a path of the control unit to the undetected connection destination port is to output the reply request;

the transfer means transfers the reply request along the transfer path defined in the reply request; and the reply transmitting means discriminates a reply transmitting path to the control unit, based on the transfer path defined in the reply request.

11. A communication method in a packet transfer device, the method comprising:

receiving a reply request addressed to a connection destination of an undetected connection destination port, the undetected connection destination port being a port in a device in a communication network that includes the packet transfer device receiving the reply request;

determining, based on information in the received reply request, whether the received reply request is to be forwarded to another packet transfer device;

transferring the received reply request if it is determined that the received reply request should be transferred; and if it is determined that the received reply request is not to be transferred to any other packet transfer device, preparing and transmitting a reply that includes information on ports of the packet transfer unit receiving the reply request.

12. The method of claim 11, wherein the reply is sent along a path leading to a control unit that sent the received reply request, the path being determined based on information in the received reply request.

13. The method of claim 11, wherein the reply transmitted to the control unit that sent the received reply request provides network topology information to the control unit to permit the control unit to eliminate an undetected connection destination port in its network topology data, the control unit having detected the undetected connection destination port in its network data and having transmitted the reply request to obtain connection information for the undetected connection destination port.

14. The method of claim 11, wherein the packet transfer device determines whether the received reply request is to be forwarded to another packet transfer device by comparing a port count in the received reply request with a number of ports in an output port list also in the received reply request.

15. The method of claim 14, wherein the packet transfer device prepares and transmits the reply to the control unit when the port count matches the number in the output port list.

16. The method of claim 12, wherein the packet transfer device reverses the listing of output ports of the output port list in the received reply request for purpose of defining a transmission path back to the control unit.

* * * * *